US010592742B1

(12) United States Patent
Hua et al.

(10) Patent No.: US 10,592,742 B1
(45) Date of Patent: Mar. 17, 2020

(54) AGENT RE-IDENTIFICATION

(71) Applicant: Amazon Technologies, Inc., Seattle, WA (US)

(72) Inventors: Gang Hua, Sammamish, WA (US); Gerald Guy Medioni, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/868,017

(22) Filed: Sep. 28, 2015

(51) Int. Cl.
*G06K 9/00* (2006.01)
*G06K 9/46* (2006.01)
*G06K 9/62* (2006.01)

(52) U.S. Cl.
CPC ....... *G06K 9/00624* (2013.01); *G06K 9/4652* (2013.01); *G06K 9/6215* (2013.01)

(58) Field of Classification Search
CPC ............ G06K 9/00624; G06K 9/4652; G06K 9/6215; G06K 2209/015; G06K 9/4647; G06T 2207/30196; G06T 7/204; G06T 7/208
See application file for complete search history.

(56) References Cited

U.S. PATENT DOCUMENTS

| | | | |
|---|---|---|---|
| 5,828,779 A * | 10/1998 | Maggioni | G06T 7/90 382/164 |
| 7,225,980 B2 | 6/2007 | Ku et al. | |
| 7,949,568 B2 | 5/2011 | Fano et al. | |
| 8,009,863 B1 | 8/2011 | Sharma et al. | |
| 8,009,864 B2 | 8/2011 | Linaker et al. | |
| 8,175,925 B1 | 5/2012 | Rouaix | |
| 8,189,855 B2 | 5/2012 | Opalach et al. | |
| 8,423,431 B1 | 4/2013 | Rouaix et al. | |
| 8,630,924 B2 | 1/2014 | Groenevelt et al. | |
| 8,688,598 B1 | 4/2014 | Shakes et al. | |
| 8,923,556 B2 * | 12/2014 | Zhang | G06K 9/00771 382/103 |
| 9,396,412 B2 * | 7/2016 | Kuo | G06K 9/6256 |
| 9,473,747 B2 | 10/2016 | Kobres et al. | |
| 9,594,979 B1 * | 3/2017 | Mishra | G06K 9/52 |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Tom Y Lu
(74) *Attorney, Agent, or Firm* — Athorus, PLLC

(57) ABSTRACT

Described is a multiple-camera system and process for re-identifying an agent located in a materials handling facility based on anterior views of agents. An anterior view of a newly detected agent may be partitioned and color signatures generated for each partition. Likewise, stored anterior views of agents (candidate agents) that may potentially be the newly detected agent are partitioned and color signatures generated for each partition. Based on the color signatures, a similarity between the anterior view of the newly detected agent and the candidate agents is determined. The similarity may be used to either determine that the newly detected agent is one of the candidate agents or reduce the set of candidate agents that are considered during a manual review.

22 Claims, 17 Drawing Sheets

(56) References Cited

U.S. PATENT DOCUMENTS

| | | |
|---|---|---|
| 2003/0002712 A1 | 1/2003 | Steenburgh et al. |
| 2004/0181467 A1 | 9/2004 | Raiyani et al. |
| 2005/0244672 A1* | 11/2005 | Che .................. C09K 11/06 428/690 |
| 2008/0055087 A1 | 3/2008 | Horii et al. |
| 2008/0077511 A1 | 3/2008 | Zimmerman |
| 2008/0109114 A1 | 5/2008 | Orita et al. |
| 2009/0121017 A1 | 5/2009 | Cato et al. |
| 2009/0129630 A1 | 5/2009 | Gloudemans et al. |
| 2009/0213240 A1 | 8/2009 | Sim et al. |
| 2009/0245573 A1 | 10/2009 | Saptharishi et al. |
| 2010/0067741 A1* | 3/2010 | Stolkin .............. G06K 9/3241 382/103 |
| 2010/0073502 A1* | 3/2010 | An ..................... G06T 7/248 348/222.1 |
| 2011/0011936 A1 | 1/2011 | Morandi et al. |
| 2011/0038535 A1* | 2/2011 | Wang ................ H04N 9/735 382/164 |
| 2011/0128374 A1* | 6/2011 | Shellshear ............ H04N 7/18 348/135 |
| 2011/0211754 A1 | 9/2011 | Litvak et al. |
| 2012/0284132 A1 | 11/2012 | Kim et al. |
| 2013/0076898 A1 | 3/2013 | Philippe et al. |
| 2013/0184592 A1 | 7/2013 | Venetianer et al. |
| 2013/0253700 A1 | 9/2013 | Carson et al. |
| 2014/0279294 A1 | 9/2014 | Field-Darragh et al. |
| 2015/0012396 A1 | 1/2015 | Puerini et al. |
| 2015/0019391 A1 | 1/2015 | Kumar et al. |
| 2015/0023563 A1 | 1/2015 | Koppal |
| 2015/0073907 A1 | 3/2015 | Purves et al. |
| 2015/0178568 A1* | 6/2015 | Shellshear .......... G06K 9/4647 382/103 |
| 2016/0147793 A1* | 5/2016 | Nomoto ........... G06F 17/30256 707/740 |
| 2016/0283590 A1* | 9/2016 | Matsuda ......... G06F 17/30793 |

OTHER PUBLICATIONS

Cristian Pop, "Introduction to the BodyCom Technology", Microchip AN1391, May 2, 2011, pp. 1-26, vol. AN1391, No. DS01391A, Publisher: 2011 Microchip Technology Inc.

* cited by examiner

AGENT RE-IDENTIFICATION

BACKGROUND

Retailers, wholesalers, and other product distributors typically maintain an inventory of various items that may be ordered, purchased, leased, borrowed, rented, viewed, etc., by clients or customers. For example, an e-commerce website may maintain inventory in a fulfillment center. When a customer orders an item, and agent picks the item from inventory, routes the item to a packing station, and an agent packs and ships the item to the customer.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
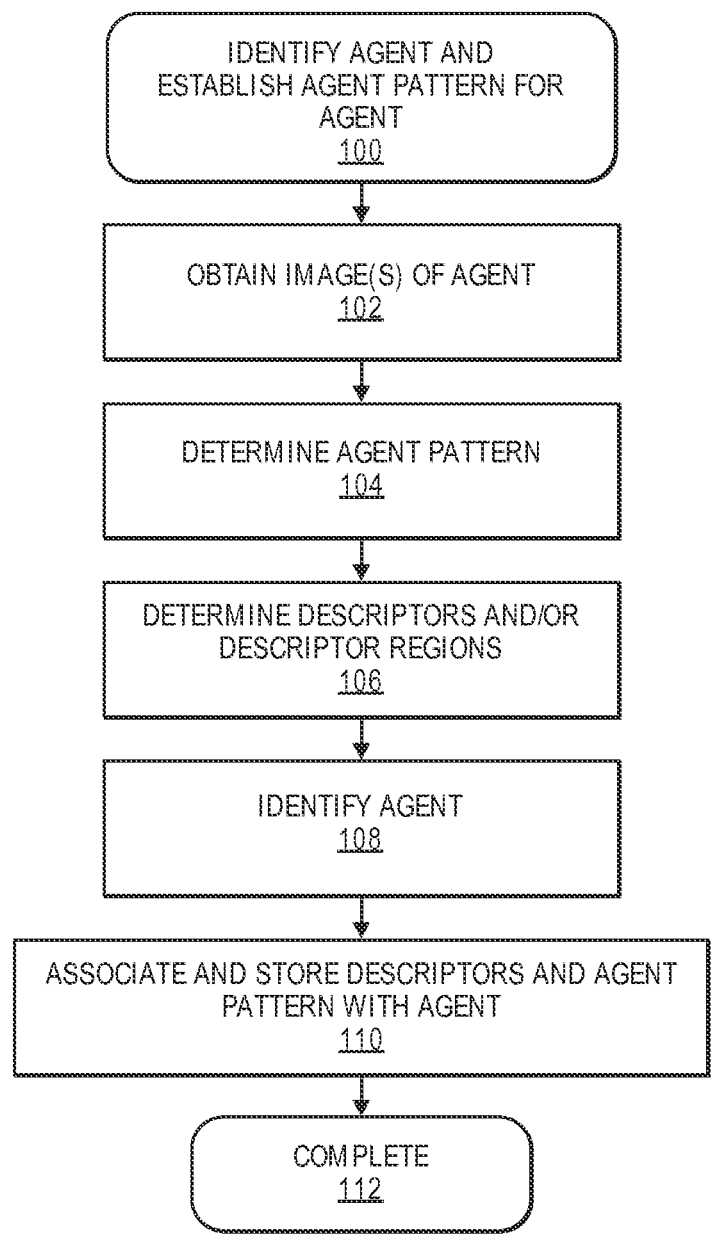
FIG. 1 is a flow diagram of an example process for identifying an agent and establishing an agent pattern, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes a multiple-camera system and process for establishing an agent pattern representative of an agent and tracking that agent as they move throughout a materials handling facility. In some implementations, the materials handling facility may include multiple overhead cameras that are fixed at defined distances above a surface of the materials handling facility and oriented toward the surface. The overhead cameras obtain images that include color values and depth values for each pixel of the image. The color values and depth values may then be used to determine an agent pattern representative of an agent that is positioned within a field of view of one or more of the cameras.

The materials handling facility also includes multiple anterior cameras that are affixed to shelves, walls or other surfaces and oriented to obtain images of agents from a side or anterior view such that the face, torso, arms, and/or legs of the agent are represented in the obtained images. The anterior cameras obtain images that include color values and/or depth values for each pixel of the image.

As the agent moves through the materials handling facility, images are obtained and processed to track a position of the agent and store position information corresponding to the agent. As part of the tracking process, an agent pattern that includes data representative of the agent is periodically determined from obtained overhead images. The agent pattern may be compared with stored agent patterns associated with the agent and/or an agent pattern data store that includes representative agent patterns to confirm that the detected object is the agent. Likewise, the distance between positions of the detected object and direction of travel may be utilized to confirm that the detected object is the agent.

In some implementations, one or more descriptors representative of the agent may also be determined and stored. The descriptors may be any feature or characteristic of the agent that may aid in the tracking or identification of the agent while the agent is located in the materials handling facility. For example, if the agent is wearing a bright yellow shirt, the color of the agent's torso may be determined and stored as a descriptor in a descriptor data store. Descriptors may be periodically obtained and added to the descriptor data store as the agent moves about the materials handling facility.

In addition to tracking a position of the agent as the agent moves through the materials handling facility, in some implementations, stored agent pattern data representative of the agent and/or the stored descriptors representative of the agent may be used to reestablish a tracking of the agent within the materials handling facility. For example, if an agent being tracked in a materials handling facility moves outside of a view of the cameras (e.g., enters a restroom, moves into an area where a camera is inoperable), the tracking of the agent may be lost. At some point in time, the agent will be rediscovered or detected when they re-enter the field of view of a camera. Because there is no continuity between the agent that was being tracked but was lost and the newly discovered agent, an agent pattern and/or descriptors of the newly discovered agent may be determined and compared with the previously stored agent patterns and descriptors of the lost agent. Based on the similarity between the agent pattern and/or descriptors of the newly discovered agent and the stored agent pattern and/or descriptors of the lost agent, the newly discovered agent may be determined to be the lost agent, and the position of the lost agent may be updated to match the position of the newly discovered agent.

In some instances, the comparison between the agent pattern of the newly discovered agent and previously stored agent pattern and descriptors of the lost agent may not provide a high enough confidence match to confirm that the newly discovered agent corresponds to the lost agent. In such instances, one or more anterior images of the newly discovered agent obtained from anterior cameras are obtained and processed to generate color signatures. Likewise, anterior images corresponding to the previously stored agent pattern of the lost agent may also be processed to generate color signatures. The color signature(s) of the anterior images of the newly discovered agent are then compared with the color signatures of the anterior images corresponding to the previously stored agent patterns to determine a similarity. Based on the similarity, the newly discovered agent may be determined to be the lost agent, and the position of the lost agent may be updated to match the position of the newly discovered agent.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling.

FIG. 1 is a flow diagram of an example process 100 for identifying an agent and establishing an agent pattern, according to an implementation. The example process of FIG. 1, and each of the other processes and sub-processes discussed herein, may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs. DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the routine. Likewise, one or more of the operations may be considered optional.

Figure 16:
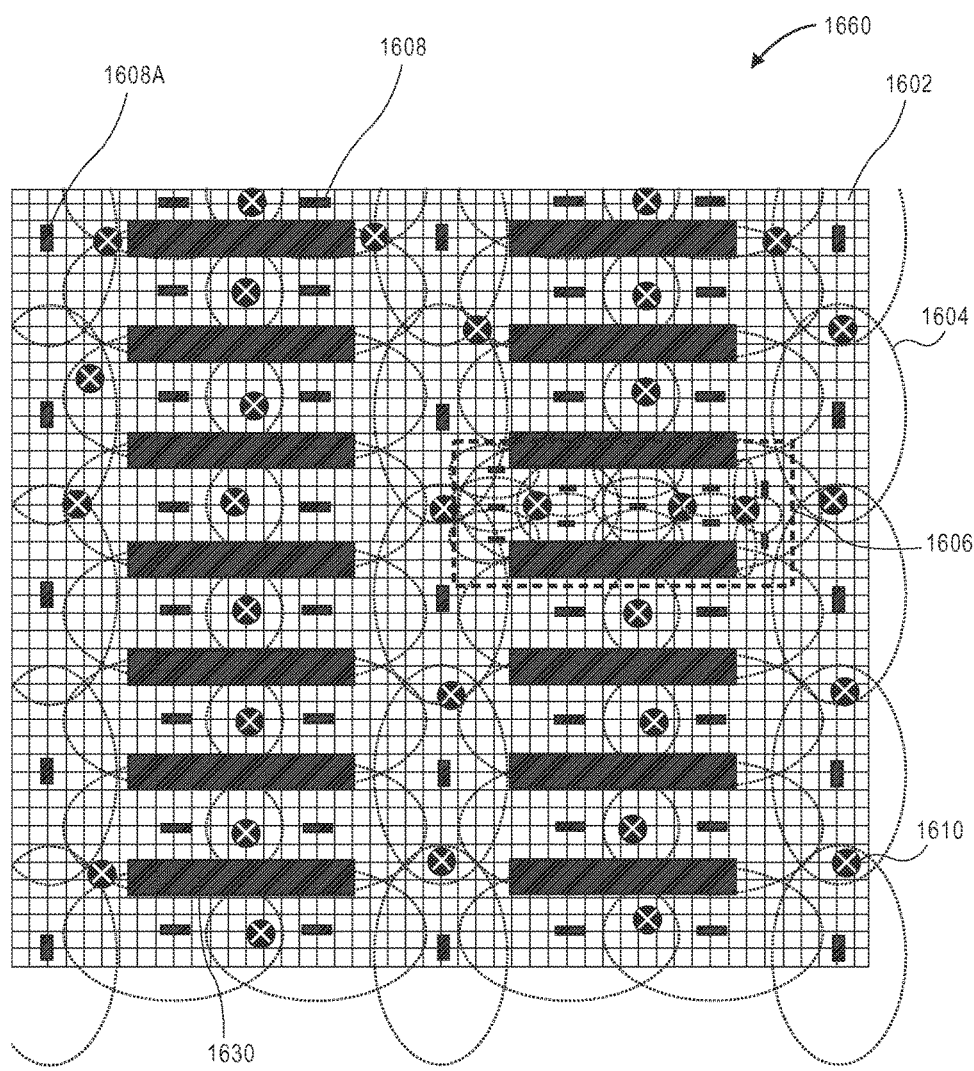
FIG. 16 is a block diagram of an overhead view of a cluster, according to an implementation.

The example process 100 begins by obtaining an image of an agent as they arrive or enter the materials handling facility, as in 102. For example, in some implementations, there may be one or more dedicated check-in or entry locations. As the agent arrives at the check-in location or passes through the entry location, one or more images of the agent may be obtained. In some implementations, images of the agent may be obtained from overhead with an overhead camera positioned above the agent and oriented straight down, similar to the positioning discussed below for cameras of a cluster (FIG. 16).

For example, a camera may be positioned at a defined location within the materials handling facility at a known distance above the surface of the materials handling facility. When the agent is located in the field of view of the camera, one or more images of the agent may be obtained. The corresponding overhead image data may include RGB color information for each pixel, coordinate information (e.g., horizontal coordinates and depth information), temperature information, etc.

Utilizing the overhead image obtained from the overhead camera(s), an agent pattern representative of the agent is determined, as in 104. For example, the overhead image data may be processed to determine an approximate height, an approximate size, and/or an approximate shape of the agent. In some implementations, a maximum or peak height of the agent may be determined along with a size, orientation, and/or shape of the agent's head and/or shoulders. The agent pattern may be determined from the one or more images or may be established over a period of time. For example, while the agent is being authenticated or identified, a series of images or video may be obtained and those images may be processed to determine the agent pattern, which may include the approximate height, size, shape, color, texture, etc., representative of the agent.

The overhead image data may also be processed to determine descriptors that may be utilized to aid in a tracking or re-identification of the agent, as in 106. For example, if the agent is wearing a bright colored shirt (e.g., yellow shirt), the color of the shirt may be a descriptor that may be used to aid in tracking the position of the agent within the materials handling facility. A descriptor may be any feature of the agent, and/or the agent pattern. For example, the descriptor may be a size, shape, volume, color pattern, texture, facial feature, etc., of the agent, or a portion of the agent represented by the agent pattern.

In addition to generating an agent pattern and determining one or more descriptors, the agent is also identified, as in 108. Agent identification may be accomplished using a variety of techniques. For example, images of the agent may be obtained and processed using object recognition algorithms, pattern matching algorithms, or the like, to identify the agent. Alternatively, or in addition thereto, the agent may provide an identification (e.g., agent name, password), the agent may present an identifier (e.g., identification badge, card), a RFID tag in the possession of the agent may be detected, a visual tag (e.g., barcode, bokode, watermark) in the possession of the agent may be detected, biometrics may be utilized to identify the agent, etc.

Upon agent identification, the agent pattern and any descriptors are associated with an agent profile and corresponding agent identifier for the agent, as in 110. The agent pattern may be stored in the agent pattern data store and the descriptors may be stored in the descriptors data store.

Likewise, a session identifier may be generated and associated with the agent profile, the agent pattern and/or the descriptors. In some implementations, the session identifier may be utilized to identify the agent profile and the agent identifier may be provided by the cluster aggregation system to other systems. In some implementations, the actual identity of the agent may not be discernible from the session identifier and/or the agent identifier. In such an implementation, only systems that need access to the actual agent information may be able to use the session identifier and/or agent identifier to obtain access to agent information.

Upon agent identification and association with an agent profile, the example process 100 completes, as in 112.

Figure 2:
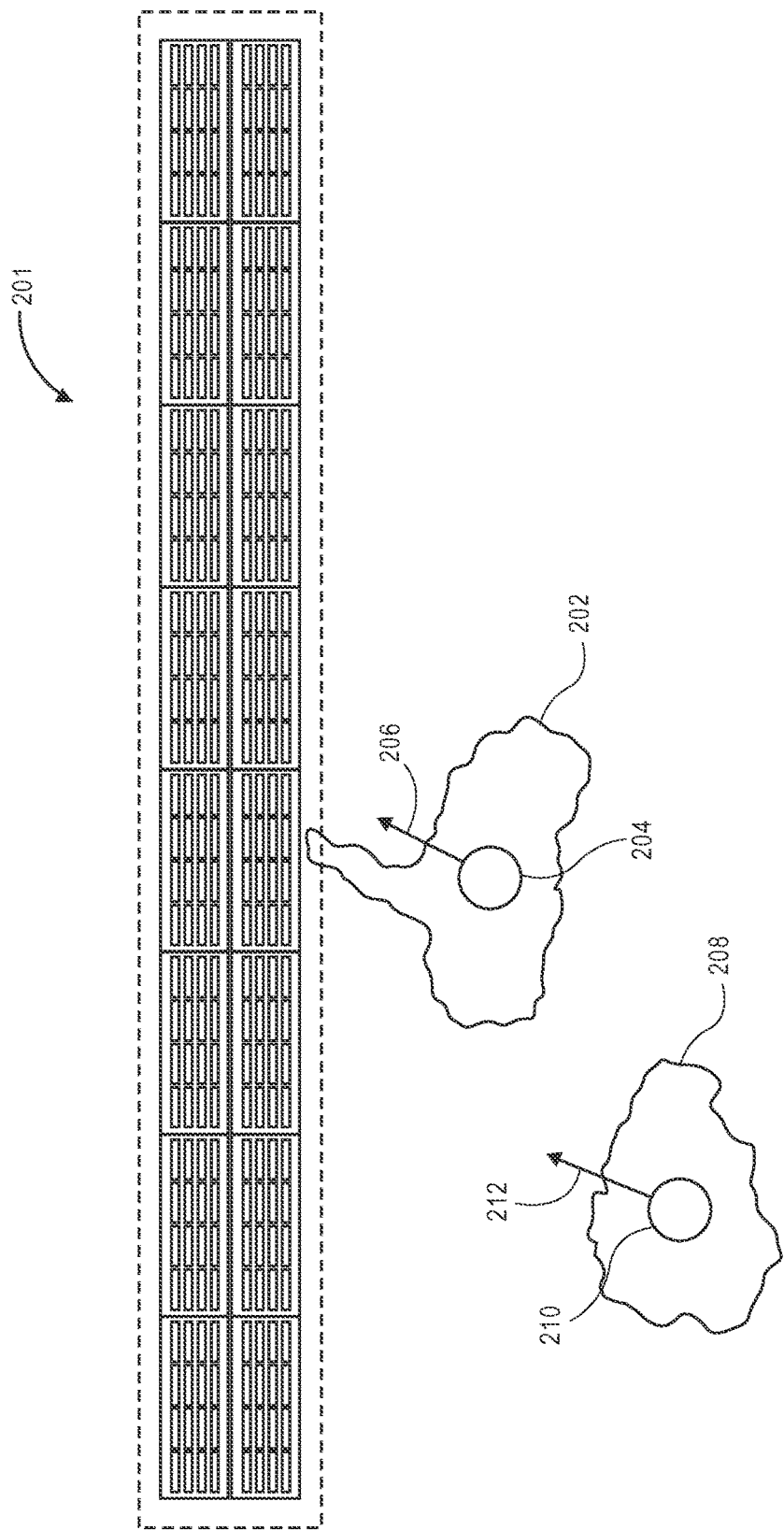
FIG. 2 is a block diagram of an inventory area and multiple agent patterns, according to an implementation.

FIG. 2 is a block diagram of an inventory area 201 and multiple agent patterns 202, 208, according to an implementation. As discussed above, the agent patterns 202, 208 are determined by processing image information obtained from overhead cameras located above the inventory area 201. In one implementation, the agent pattern is determined based on depth information obtained by the overhead cameras. As agents move throughout the materials handling facility, they may interact with items, pick items from inventory locations, place items at inventory locations, move items, and/or perform other events.

The agent patterns 202, 208 are established based on the depth values and horizontal pixel coordinates included in the image data obtained from the overhead cameras for the pixels that represent the agent.

Utilizing the depth information and/or color values of the pixels that represent the agent, a peak height, or approximate height, of the agent pattern can be determined. For example, an initial classifier may be utilized by the cluster processing system to identify objects in the reduced image data. The peak height (highest height of a pixel) of the object may be determined and if the peak height is above a height threshold, it may be determined that the object is an agent. In some implementations, the object may be tracked over a series of frames/images or for a defined period of time before it is determined whether the object is an agent. In such an example, the movement of the object and/or the average peak height for each object detected in each frame of the reduced image data may be considered in determining whether the object is an agent.

In some implementations, descriptors representative of the agent pattern, or segments thereof, may likewise be determined. Descriptors include, but are not limited to, a height of the agent or the agent pattern, a shape of the agent or the agent pattern, a size of the agent or the agent pattern, a width of the agent or the agent pattern, a facial feature of the agent, a color histogram representative of at least a portion of the agent or the agent pattern, a color of an item of clothing worn by the agent, a facial feature of the agent, a length of a body part of the agent, a color pattern of an item of clothing, a texture of the agent pattern, a posture of the agent or the agent pattern, a pose of the agent or the agent pattern, a gait of the agent or the agent pattern, or a speed of movement of the agent or the agent pattern.

Color information of the object may be determined based on the color values of pixels representing the object. Likewise, color values of the pixels representing the agent pattern may be determined.

During a period of time, such as while an agent is located in a materials handling facility, the agent pattern and/or descriptors may be periodically determined with each series or frame of images. The agent patterns may be determined to correspond to the same agent based on the proximity of the agent patterns over the period of time, a predicted trajectory or direction of movement of the agent based on the tracked positions of the agent over the period of time, a similarity between the descriptors of each agent pattern, etc.

In some implementations, it may also be determined whether the position associated with an agent pattern is within a defined distance of a position associated with an agent pattern of another agent. If the position associated with the agent pattern is not within the defined distance of an agent pattern of another agent, the agent pattern may be added to the agent patterns associated with the agent stored in the agent pattern data store. Likewise, the determined descriptors may be stored in the descriptor data store and added to the other stored descriptors representative of the agent and/or the agent pattern. By aggregating the agent patterns for an agent determined during a period of time, the different positions, shapes, orientations, etc., of the agent, as represented by the agent patterns, may be used to establish a more robust agent pattern data store that may be used to detect the agent and/or re-establish a tracking of an agent. Similarly, by aggregating the descriptors during a period of time, the different positions, shapes, colors, orientations, etc., of the descriptors may be used to establish a more robust descriptor data store that may be used to detect the agent and/or re-establish a tracking of an agent.

If it is determined that the position associated with the agent pattern is within a defined distance of the position associated with another agent pattern representative of another agent, the agent pattern may not be added to the data store and the descriptors of the agent pattern may not be added to the descriptor data store. Instead, the aggregated agent patterns of the agent and/or the aggregated descriptors of the agent may be utilized to aid in the detection of the agent.

For example, it may be determined that the agent pattern 202 is within a defined distance of agent pattern 208 and, likewise, agent pattern 208 is within a defined distance of agent pattern 202. To aid in the detection and tracking of each agent represented by agent patterns 202, 208, the agent patterns 202, 208 obtained from the reduced image data and/or the corresponding descriptors may be compared with stored agent patterns and/or stored descriptors associated with the agent represented by the agent patterns 202, 208. For example, if the agent represented by agent pattern 208 is six feet four inches tall and weighs two-hundred pounds and the agent represented by agent pattern 202 is also six feet four inches tall and weighs two-hundred pounds, it may be difficult to distinguish between the two agents without considering additional information, such as the descriptors, direction of travel, prior position information, etc. For example, if the agent represented by the agent pattern 202 is wearing a yellow shirt and the agent represented by the agent pattern 208 is wearing a black shirt, the descriptors associated with each agent pattern may be determined and compared with stored descriptors associated with each agent pattern to aid in disambiguating between the two agent patterns and properly associating each agent pattern with the correct agent.

As another example, it may be determined that the position associated with agent pattern 202 is beyond the defined distance of another agent pattern. In such an example, there is limited risk of improperly identifying the agent pattern and a strong confidence score may be determined that the agent pattern and corresponding descriptors represent the agent. In such an example, the determined agent pattern may be added to the agent pattern data store and the descriptors may be added to the descriptor data store and associated with the agent.

For each agent pattern, a center point 204, 210 and/or an orientation 206, 212 of the agent may also be determined. For example, the center point 204, 210 of the agent pattern may be determined based on the depth information for pixels that represent the agent pattern (e.g., pixels with greatest height above surface), by selecting a group of pixels at or near a center of the agent pattern, etc. Orientation 206, 212, which is represented graphically as a vector in FIG. 2, may be determined based on a movement of the agent over a period of time, based on image processing, etc. The center point and/or the orientation of the agent pattern may be used, as discussed below, in selecting anterior cameras from which anterior images of the agent are to be obtained.

Figure 3:
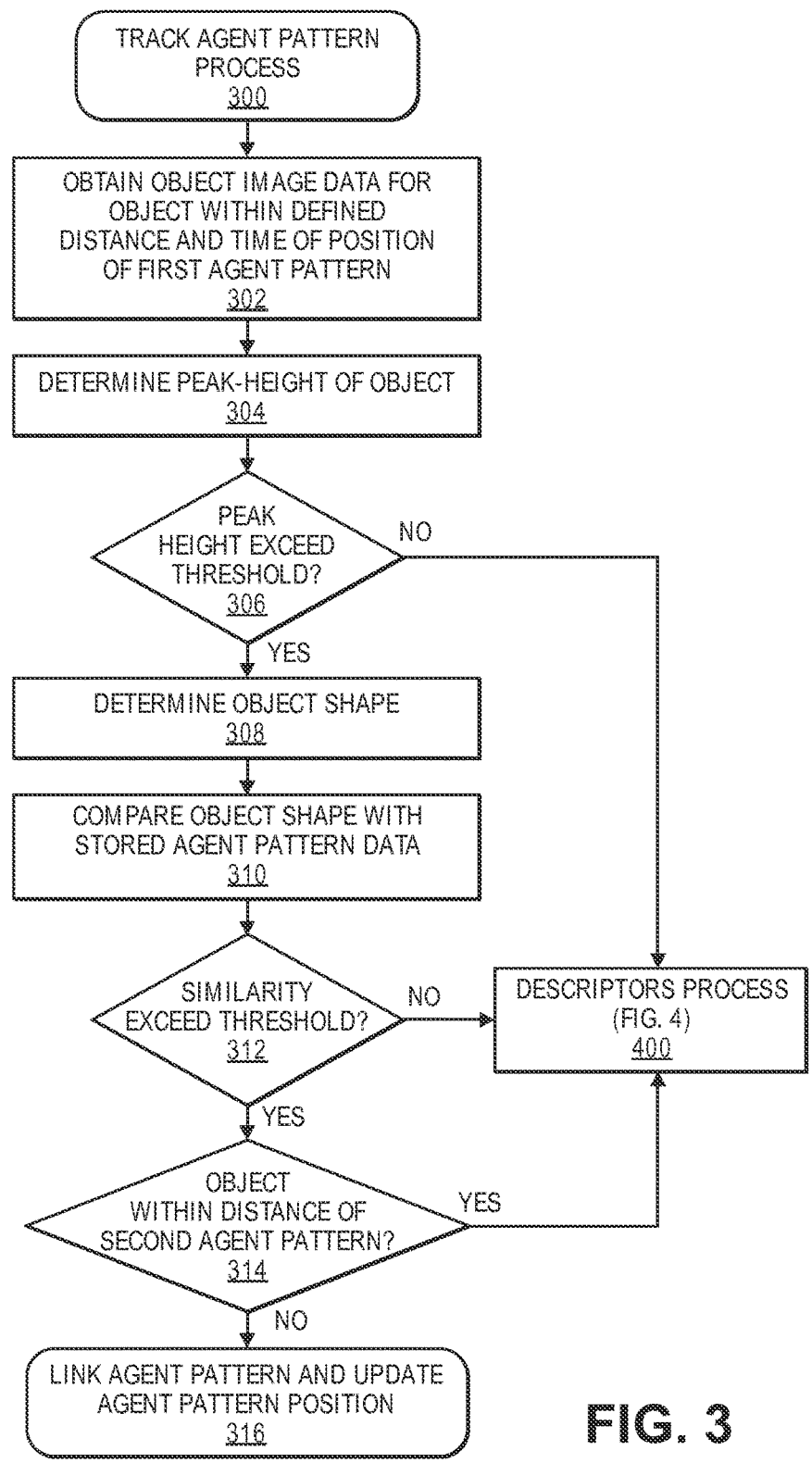
FIG. 3 is a flow diagram of an example process for tracking an agent pattern, according to an implementation.

FIG. 3 is a flow diagram of an example process 300 for tracking an agent pattern, according to an implementation. The example process 300 may begin as soon as an agent has been identified and an initial agent pattern and/or descriptors established according to the example process 100 (FIG. 1). When the example process 300 initiates, object image data is received for an object that is within a defined distance and time of a position associated with a first agent pattern, as in 302. For example, if the agent has been identified and an agent pattern established (e.g., first agent pattern) according to the example process 100, the object image data received by the example process 300 may be a representation of the agent at a second time.

Object image data may include color values and coordinates (horizontal and depth) for each pixel of the images included in the object image data. The images may include both overhead images obtained from overhead cameras and/or anterior images obtained from anterior cameras. The defined distance may be any distance that an agent may possibly travel during the defined time. Likewise, the defined time may be any period of time. In one implementation, the defined time may be one second and the defined distance may be one foot.

Utilizing the obtained image data, a peak height of the object is determined, as in 304. In one implementation, a classifier is utilized to process the depth values associated with each pixel of an overhead image to identify a peak height of the object represented in the object data. For example, if the depth values identify a distance between the portion of the agent represented by the pixel and the camera that obtained the image, the peak height may be identified as the pixel that has a depth value of a shortest distance to the camera. In another example, a height may be determined for each depth value of each pixel of an overhead image. The height is computed as the difference between a known distance between the overhead camera and the surface of the materials handling facility. The peak height may then be identified as the pixel having the highest height value. In another implementation, a classifier may process cells or groups of pixels to quickly identify an area that includes a peak value.

Based on the peak height, a determination is made as to whether the peak height exceeds an agent pattern height threshold, as in 306. The agent pattern height threshold may be a minimum value for any agent pattern. For example, the peak height may be four feet. If the peak height exceeds the threshold, the object may be initially considered a potential agent. If the peak height does not exceed the threshold, the object may initially not be considered a potential agent.

While this example describes utilization of a peak height for initial determination if the object is potentially an agent, in other implementations, other features and/or considerations may be utilized to initially determine if the object is potentially an agent. For example, a shape of the object may be initially considered in addition to or as an alternative to the peak height of the object.

If it is determined that the peak height exceeds the agent pattern height threshold, a shape of the object is determined, as in 308. The shape of the object may be determined using a more detailed classifier that processes a higher density of pixels of the overhead image data to determine a shape of the object. For example, the classifier may be a Gaussian classifier that processes the coordinates (horizontal values and/or depth values) associated with the pixels to determine whether the object includes a head shape and/or shoulder shape. In one implementation, the classifier may utilize the agent pattern data store, established as discussed below with respect to FIG. 5, to compare determined shapes of the object with shapes of the stored agent pattern data, as in 310. Likewise, the shapes of the object may be compared with the agent pattern data stored for the agent that were established at a prior point in time (e.g., when the agent was first identified according to the example process 100, or at a prior time using the example process 300).

In comparing the determined shapes of the object with the stored agent pattern data, a similarity score is determined identifying a similarity between the determined shapes of the object and the shapes of the stored agent pattern data. The similarity score may be determined using a Hungarian matching algorithm, feature matching algorithm, or the like to determine a similarity between the image data and the stored agent patterns.

A determination is also made as to whether the similarity score exceeds a similarity threshold, as in 312. For example, if the agent pattern is processed and determined to have shapes that are similar to the head and shoulder shapes of one or more stored agent patterns, it may be determined that the object has a high similarity score. In comparison, if the object is a tote, it will not be determined to have a head shape and a shoulder shape that is similar to the head shape and shoulder shape of a stored agent pattern and will thus have a low similarity score. The similarity score may be any type of identifier that can be used to indicate a similarity between the determined object and stored data. For example, the similarity score may be a numerical value, a yes/no indicator, a flag, etc.

The similarity threshold, and each of the other thresholds discussed herein, may be any defined value and may be different for different agents, different for different areas within the materials handling facility, different for different times of day, etc. Like the other thresholds described herein, the similarity threshold may also be another form of measuring or comparing values. For example, the threshold may represent a delta comparison between values, a bitwise subtraction, or the like.

If it is determined that the similarity score exceeds the similarity threshold, a determination is made as to whether the object is within a defined distance of a second agent pattern, as in 314. The defined distance may be any distance. In some implementations, the defined distance may be the same defined distance discussed above with respect to block 302. If the object is within a defined distance of a second agent pattern, it may be determined that there are potentially two or more agents near one another. In such an instance, additional analysis may be performed before the object is confirmed to be an agent, linked to the first agent pattern and associated with the agent. In comparison, if it is determined that the object is not within a defined distance of a second agent pattern, the object is determined to be an agent, the agent pattern is linked to the first agent pattern and the corresponding agent and a position of the agent and the first agent pattern is updated to match the position of the object, as in 316. The object may be linked to the first agent pattern and/or the agent by associating a session identifier with the object. In some implementations, an expected trajectory, gate or speed of the agent may likewise be determined based on the trajectory of linked agent patterns and/or the distance and time between each linked agent pattern.

Figure 7:
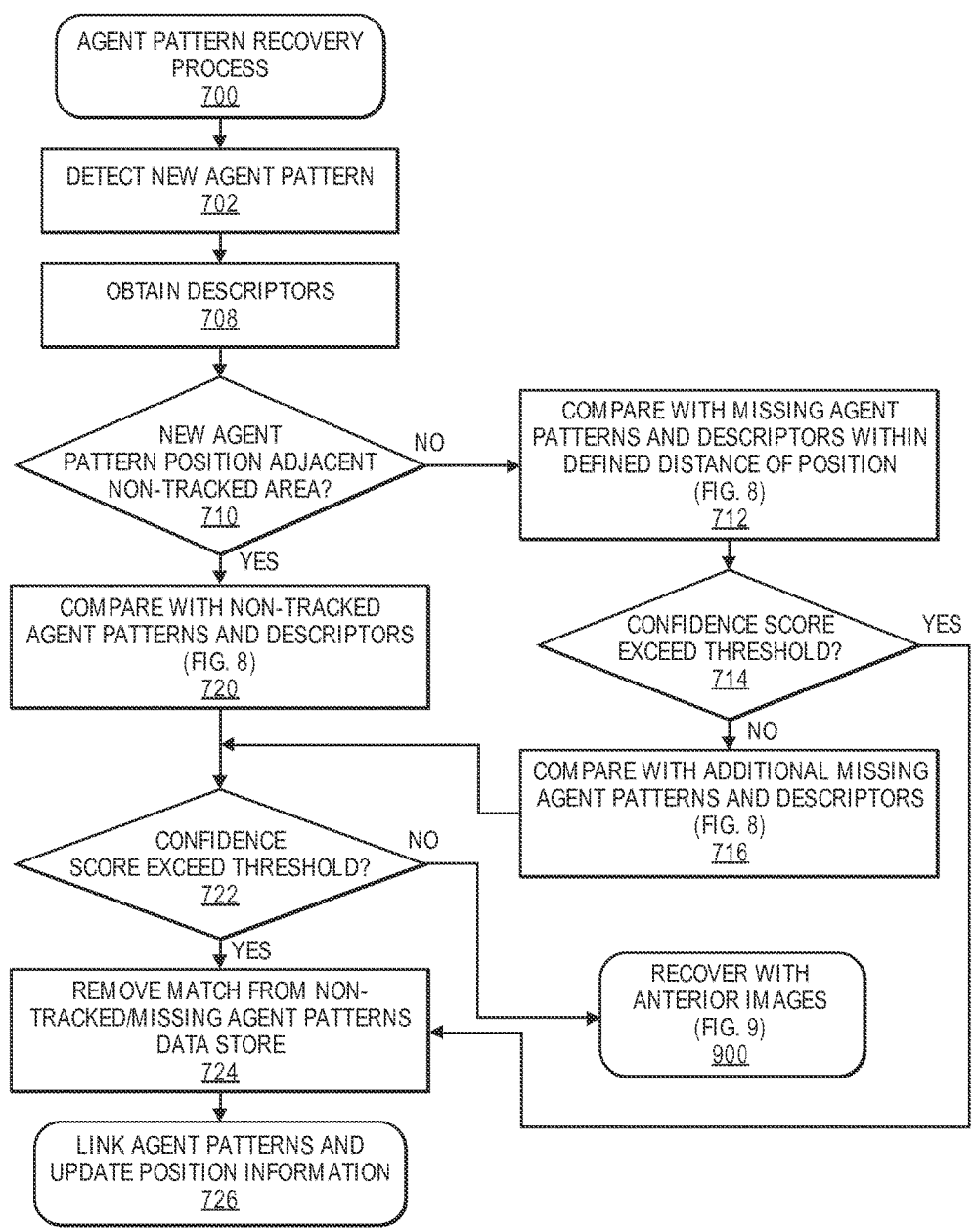
FIG. 7 is a flow diagram of an agent pattern recovery process, according to an implementation.

If it is determined that the peak height does not exceed the agent pattern height threshold (decision block 306), that the similarity score does not exceed the similarity threshold (decision block 312), or if it is determined that the object is within a defined distance of a second agent pattern (decision block 314), the descriptors process 400 may be performed to determine if the object is an agent pattern. The descriptors process 400 is discussed below with respect to FIG. 4. In another implementation, rather than utilizing the descriptors process 400, in some implementations, if the position of the agent is not updated, the tracking of the agent may be considered lost and the example process may proceed to the recovery process 700 (FIG. 7).

Figure 4:
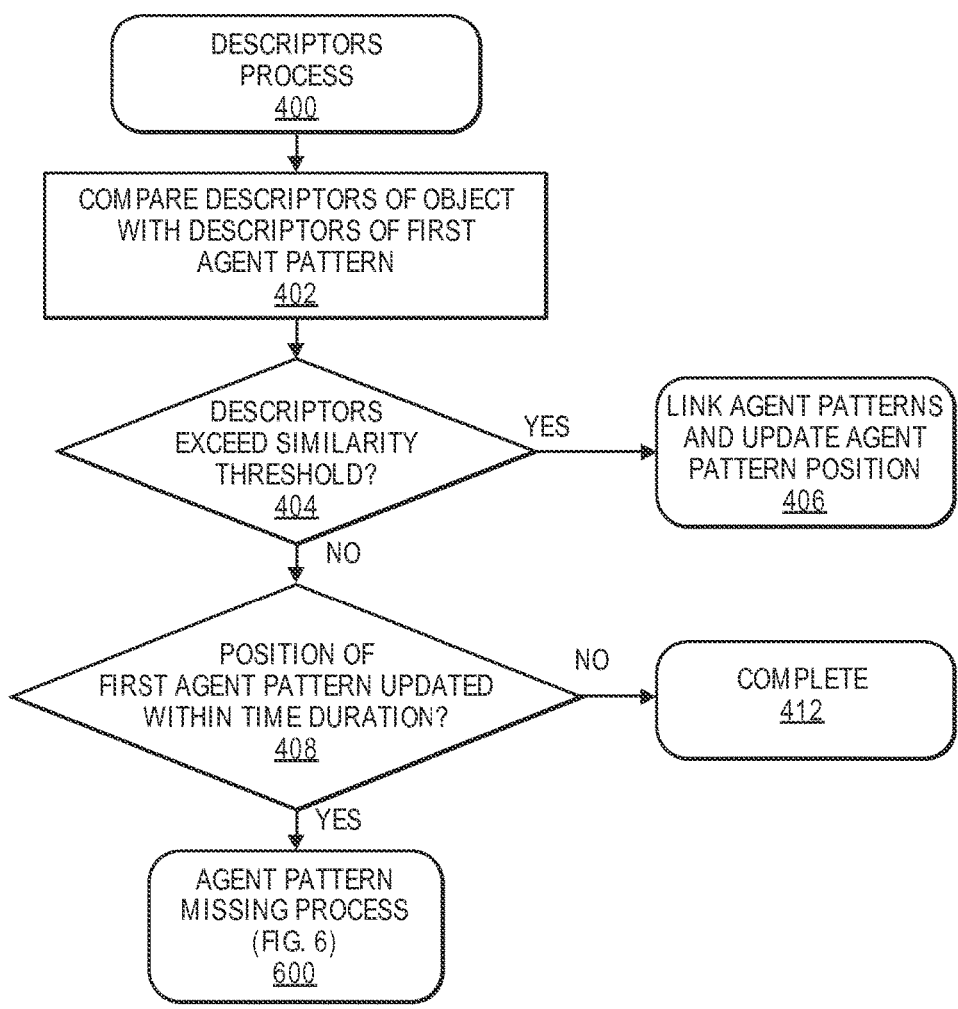
FIG. 4 is a flow diagram of an example descriptors process, according to an implementation.

FIG. 4 is a flow diagram of an example descriptors process 400, according to an implementation. As discussed above, descriptors may be determined and stored in a descriptor data store for agent patterns. Likewise, descriptors may be determined for object image data that is being processed to determine if the object is an agent. For example, one or more descriptors for the object may be generated. The descriptors for the object may then be compared to the stored descriptors for the first agent pattern, as in 402. For example, the descriptors may include color values or color histograms of the object. A Hungarian algorithm (Hungarian Method) or other matching process may be used to determine a similarity between the object descriptors and the stored descriptors of the first agent pattern. The comparison of the descriptors may result in a descriptor similarity score identifying how similar the descriptors of the object are to the stored descriptors of the first agent pattern.

A determination may then be made as to whether the descriptor similarity score exceeds a descriptor similarity threshold, as in 404. Like the other thresholds, the descriptor similarity threshold may be any value and may vary for different agents, different agent patterns, different locations within the materials handling facility, etc.

If it is determined that the similarity score exceeds the similarity threshold, the object may be determined to be an agent pattern representative of the agent and the object may be linked to the first agent pattern, as in 406. Likewise, the position of the first agent pattern may be updated to match the position of the object.

In some implementations, it may also be determined whether the object corresponds to a predicted trajectory of the first agent pattern. For example, as the agent pattern is tracked through the materials handling facility and each determined agent pattern linked, a predicted trajectory may be determined. In addition to considering the object shape and/or descriptors, the position of the object may be considered as a factor in determining whether the object is an agent pattern representative of the agent.

If it is determined that the similarity score does not exceed a threshold, it may be determined if the position of the first agent pattern has been updated within the time duration, as in 408. The time duration may be any defined time. For example, the time duration may be five seconds. If it is determined that the position of the first agent pattern has not been updated within the time duration, it may be determined that tracking of the agent represented by the first agent pattern has been lost and the agent missing process 600 (FIG. 6) may be performed. If it is determined that the position of the agent pattern has been updated within the time duration, the example process 400 completes, as in 412.

The example processes 300 (FIG. 3) and 400 (FIG. 4) may be periodically or continuously performed to track an agent using images from the overhead cameras as the agent moves through the materials handling facility. For example, the first agent pattern, as discussed with respect to FIGS. 3-4, may be the agent pattern determined during a prior iteration of the example processes 300 and/or 400. In one implementation, image data may be obtained from overhead cameras at a rate of fifteen frames per second and those frames may be processed to determine an object, compare that object to a first agent pattern of the agent, determine if the object is representative of the agent and update the position of the agent. The processes 300, 400 may then repeat for the next frame.

In addition to determining if an object represented in an overhead image corresponds to an agent, in some instances, the determined agent pattern and/or descriptors may be added to the agent pattern data store and/or descriptors data store representative of the agent and utilized as stored agent pattern data and descriptor data to continue tracking the agent. In addition, one or more anterior images of the agent may be obtained and stored in the agent pattern data store as corresponding to the agent pattern. Anterior cameras from which images are to be obtained and associated with the agent pattern may be selected based on, for example, the position, orientation, and/or trajectory of the agent pattern such that the obtained anterior images include a representation of the agent from a front and/or side view.

Figure 5:
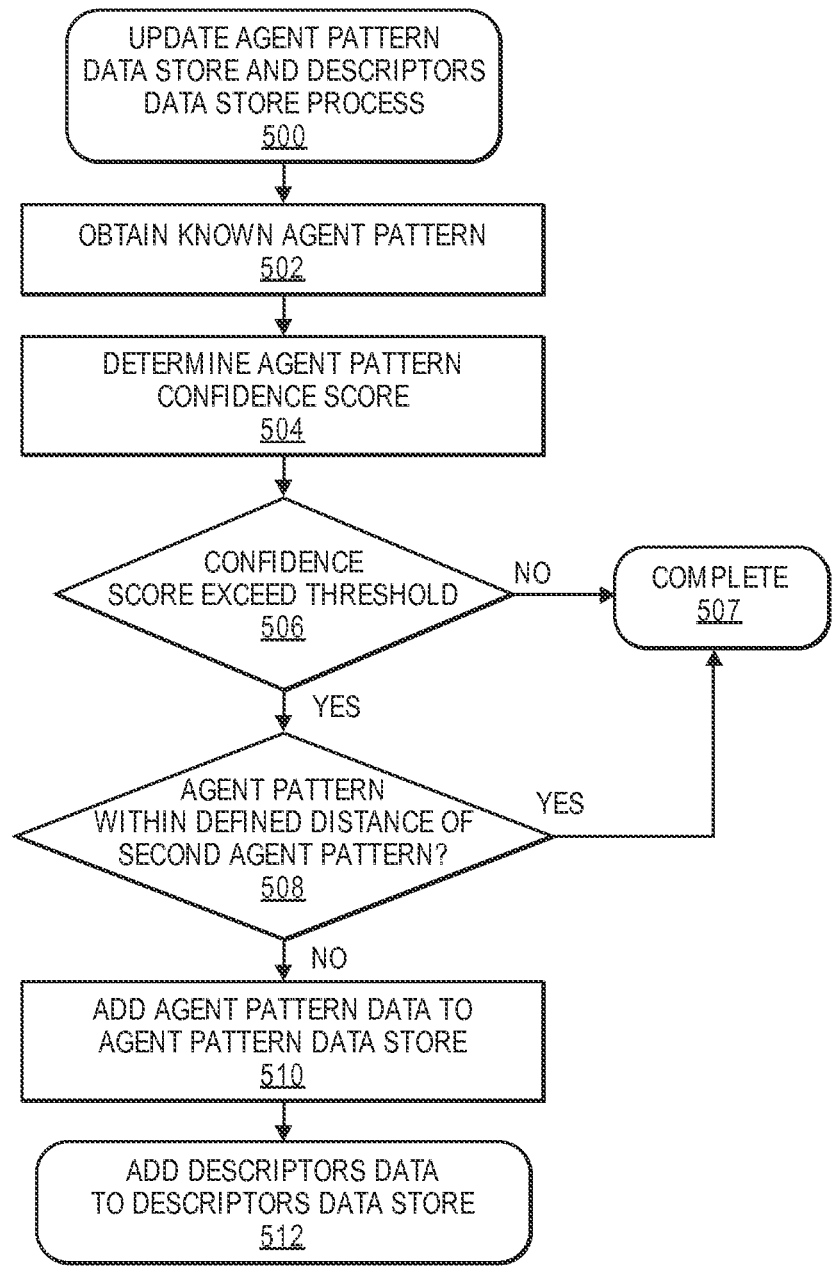
FIG. 5 is a flow diagram of an example process for updating an agent pattern data store and a descriptor data store, according to an implementation.

FIG. 5 is a flow diagram of an example process 500 for updating an agent pattern data store and a descriptors data store for an agent that is being tracked through the materials handling facility, according to an implementation. The example process 500 begins by obtaining a known agent pattern that is representative of an agent, as in 502. For example, when an object is determined to be an agent as part of the example processes 300, 400, the agent pattern representative of the object may be a known agent pattern. A confidence score may then be determined that represents a confidence level that the known agent pattern is a good representation of an agent pattern for the agent, as in 504. A determination may be made as to whether the confidence score exceeds a confidence threshold, as in 506. If it is determined that the confidence score does not exceed the confidence threshold, the example process 500 completes, as in 507. In some implementations, there may be no determined confidence score and any agent pattern may be processed according to the following blocks (508-512) of the example process 500.

If it is determined that the confidence score exceeds a threshold, or if no threshold is utilized, a determination is made as to whether the position associated with the agent pattern is within a defined distance of a position of a second agent pattern, as in 508. If it is determined that the agent pattern is within a defined distance of a second agent pattern, meaning that two agents are within a defined distance of one another, the example process 500 completes, as in 507. However, if it is determined that the agent pattern is not within a defined distance of a second agent pattern, the agent pattern representative of the agent is added to an agent pattern data store that includes agent pattern data representative of the agent, as in 510. The agent pattern data stored in the agent pattern data store that is representative of the agent may be only temporarily stored and used while the agent is located in the materials handling facility. In other implementations, the agent pattern data stored in the agent pattern data store that is representative of the agent may persist and be utilized at any time the agent is located in the materials handling facility.

In some implementations, the agent pattern may also be added to the agent pattern data store of agent pattern data that is established as discussed below with respect to FIG. 8 and utilized to determine whether an object is an agent pattern. By periodically or continually adding or aggregating agent pattern data with other confirmed agent pattern data, the agent pattern data store becomes more robust and is able to detect a larger range of different sizes and/or shapes of agents. Likewise, in some implementations, agent pattern data stored in the agent pattern data store may decay over a period of time and/or newer agent pattern data may have a higher weighting to account for changes in agent patterns over a period of time. For example, during the summer months, agent patterns may appear different than during winter months due to the difference of clothing worn during those different seasons.

In addition to updating the agent pattern data store(s), the descriptors determined as representative of the agent pattern may be added to the descriptors data store for the agent, as in 512. The descriptors stored in the descriptor data store that are representative of the agent may be only temporarily stored and used while the agent is located in the materials handling facility. By periodically or continually adding or aggregating descriptors determined while an agent moves around the materials handling facility, a larger sample of descriptors representative of the agent may be obtained. The larger sampling of descriptors may improve the detection or confirmation that an object corresponds to a particular agent pattern because there is a wider sampling of descriptors obtained when the agent is in different positions, poses, lighting, etc.

In some implementations, descriptors stored in the descriptors data store may decay over a period of time and/or newer descriptors may have a higher weighting to account for changes in the appearance of the agent. For example, if an agent takes off their jacket or takes off their hat while moving through the materials handling facility, the descriptors may change. To illustrate, if the agent is wearing a black jacket, the descriptor representative of the agent pattern may include a color histogram representative of the black jacket. If, while the agent is moving through the materials handling facility, the agent removes the black jacket and is wearing a yellow shirt, the descriptor for the agent will change. Specifically, the color histogram will change to represent the yellow shirt. By decaying or weighting descriptors, the system is more robust to changes.

While the examples discussed above focus on utilizing overhead cameras, stored agent pattern data, and stored descriptors to continually track a movement of an agent through a materials handling facility, in some instances, tracking of an agent may be lost. For example, if an agent moves into a non-tracked area where there are no overhead cameras, the current position of the agent cannot be maintained (i.e., the stored position of the agent is not current) and tracking of the agent may be lost. As another example, if the agent moves into an area where an overhead camera has become inoperable or moves to a position in which the agent cannot be viewed by an overhead camera (e.g., under a table or counter), the position of the agent may not be current as tracking of the agent may be lost. In still another example, if the agent moves into a position in which the systems are unable to confirm that the object is the agent, the tracking of the agent may be lost. For example, if the agent kneels or sits on the floor for an extended period of time such that they are below the agent pattern height threshold, the tracking of the agent may be lost. In still another example, if the agent exits the materials handling facility, the tracking of the agent may be lost. Regardless of the reason, a tracking of an agent using overhead cameras may be determined to be lost if the position of the agent is not updated during a defined period of time. For example, as discussed above with respect to FIG. 4, if the position of the agent pattern is not updated within a defined period of time, the position of the agent is not current and the tracking of the agent pattern may be determined to be lost.

Figure 6:
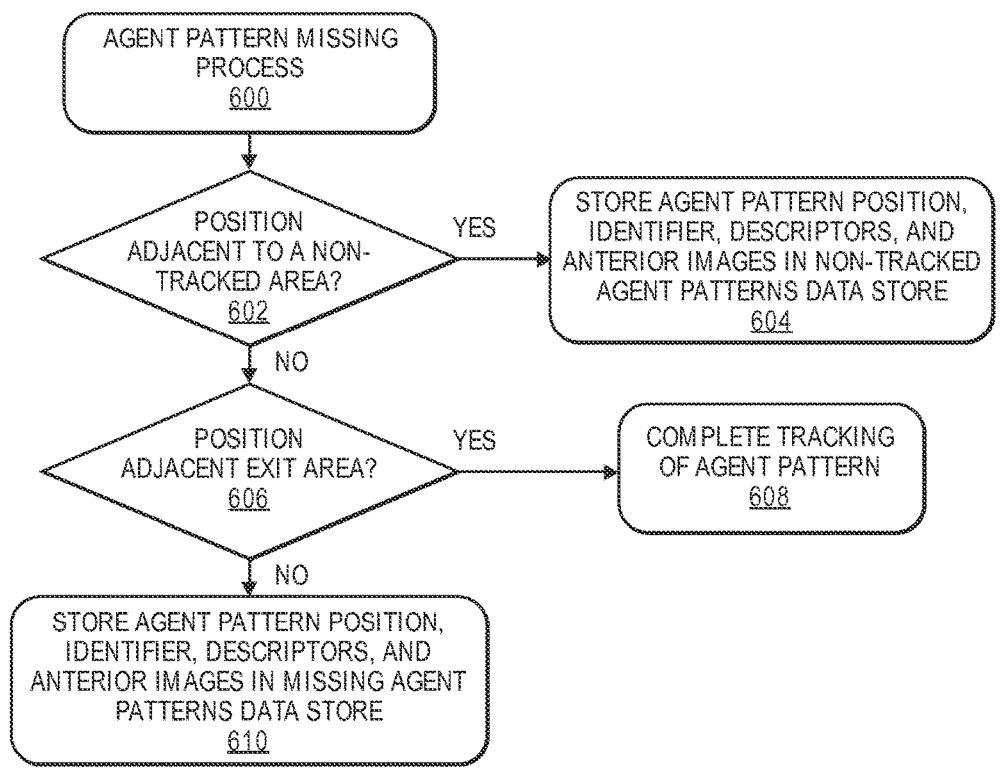
FIG. 6 is a flow diagram of an example agent pattern missing process, according to an implementation.

When the position of the agent is not current, an agent missing process 600, as discussed with respect to FIG. 6, is performed, according to an implementation. The example process 600 begins by determining if the stored position or last position of the agent pattern is adjacent to an entry or exit of a non-tracked area, as in 602. A non-tracked area may be any area within the material handling facility where tracking of an agent is not available. For example, cameras may not be located in restrooms, changing rooms, break rooms, storage areas, etc. Areas without cameras may be considered non-tracked areas.

If it is determined that the stored position of the agent pattern is adjacent to a non-tracked area, the agent pattern, position of the agent pattern, the agent identifier (or associated session identifier), the time at which the position of the agent became no longer current, descriptors associated with the agent pattern, and anterior images that include a representation of an anterior of the agent are stored in a non-tracked agent patterns data store, as in 604. In some implementations, it may also be determined based on a series of linked agent patterns whether the predicted trajectory of the agent pattern is in the direction of the non-tracked area.

While the example process 600 describes storing each of the agent pattern, position, descriptors, and anterior images in a non-tracked agent patterns data store, in some implementations, the agent identifier or session identifier of the agent may be added to the non-tracked agent pattern data store to identify the agent, agent pattern, etc., and the agent pattern, descriptors, anterior images, etc., may be maintained in the agent pattern data store and descriptors data store, as discussed herein.

If it is determined that the stored position of the agent pattern is not adjacent to a non-tracked area, a determination is made as to whether the stored position of the agent pattern is adjacent to an exit from the materials handling facility, as in 606. If it is determined that the stored position of the agent pattern is adjacent to an exit from the materials handling facility, tracking of the agent pattern is completed, as in 608. If the agent returns or re-enters the materials handling facility after exiting, the agent will be re-identified and a new session identifier or agent identifier generated and used to track the agent, as discussed above. In some implementations, before it is determined that the agent has exited the materials handling facility, it may also be determined, based on a series of linked agent patterns, whether the predicted trajectory of the agent pattern is in the direction of the exit from the materials handling facility.

If it is determined that the stored position of the agent pattern is not adjacent to an exit from the materials handling facility, the agent pattern, position of the agent pattern, the agent pattern identifier (or associated session identifier), the time at which the position of the agent became no longer current, descriptors associated with the agent pattern, and anterior images obtained at the time at which the position of the agent became no longer current and which include an anterior view of the agent are stored in a missing agent patterns data store, as in 610. In some implementations, a predicted trajectory of the agent associated with the agent pattern may also be determined and stored in the missing agent patterns data store. The predicted trajectory may be determined based on a series of linked agent patterns.

While the example process 600 describes storing each of the agent pattern, position, time, descriptors, and anterior images in a missing agent patterns data store, in some implementations, the agent identifier or session identifier of the agent may be added to the missing agent patterns data store and the agent pattern, descriptors, anterior images, etc., may be maintained in the agent patterns data store and descriptors data store as discussed herein.

By storing or identifying agent pattern information (e.g., position, agent pattern data, descriptors, anterior images) in either a missing agent patterns data store or a non-tracked area agent patterns data store, the information may be used to re-establish tracking of an agent when a newly identified agent pattern is detected.

FIG. 7 is a flow diagram of an agent pattern recovery process 700, according to an implementation. The example process 700 begins by detecting a new agent pattern at a location within the materials handling facility other than at an entry point into the materials handling facility, as in 702. As discussed above, an object may be detected from reduced image data as anything that exceeds a difference threshold from baseline image data. Such an object may be determined to be an agent and thus represented by an agent pattern using the techniques discussed above. If the agent pattern cannot be associated with an agent or linked to another agent pattern, the agent pattern is considered a new agent pattern.

In addition to detecting a new agent pattern, descriptors for the new agent pattern may also be determined, as in 708. Descriptors may be determined as discussed above. A determination may be made as to whether a position associated with the new agent pattern is adjacent to an entry or exit of a non-tracked area, as in 710. If the agent pattern is adjacent to a non-tracked area, the agent represented by the new agent pattern may correspond to an agent that previously entered the non-tracked area and whose tracking has been lost.

If it is determined that the new agent pattern is adjacent to a non-tracked area, the agent pattern and the determined descriptors for the new agent pattern are compared with agent patterns and descriptors identified in the non-tracked agent patterns data store, as in 720. Comparing agent patterns and descriptors of a new agent pattern with stored agent patterns and descriptors included in the non-tracked agent patterns data store is discussed further below with respect to FIG. 8. In some implementations, it may be determined whether an identifier, such as an RFID, is detected that can be used to identify the agent represented by the new agent pattern. If an identifier is detected, the new agent pattern may be associated with the corresponding agent and the example process 700 may complete.

If it is determined that the new agent pattern is not adjacent to a non-tracked area, the agent pattern and the determined descriptors for the new agent pattern are compared with agent patterns and descriptors identified in the missing agent patterns data store that are within a defined distance of the new agent pattern, as in 712. The defined distance may consider both the distance between the last known position of a missing agent pattern as well as the time at which the position of the missing agent pattern became not current. The longer an agent has been missing, the larger the area in which the missing agent may be located. As such, the defined distance may be different for different missing agent patterns. For example, an agent pattern that has been missing five seconds may have a small defined distance and only be considered if it is within that defined distance of the newly identified agent pattern. In comparison, an agent pattern that has been missing for five minutes will have a larger defined distance (because the agent could have moved farther during that amount of time) and will be considered if the position of the newly identified agent pattern is within that defined distance. Comparing agent patterns and descriptors of a new agent pattern with stored agent patterns and descriptors included in the missing agent patterns data store is discussed further below with respect to FIG. 8.

Based on the comparison of the new agent pattern and descriptors with the agent pattern and descriptors of the missing agent patterns data store that are within a defined distance of the position of the new agent pattern, as described below with respect to FIG. 8, a confidence score is returned and a determination is made as to whether the returned confidence score exceeds a threshold, as in 714. If it is determined that the confidence score does not exceed the threshold, the new agent pattern and descriptors may be compared with additional agent patterns and descriptors maintained in the missing agent patterns data store, as in 716. Depending on the number of agent patterns identified in the missing agent patterns data store, the additional missing agent patterns may include all the additional missing agent patterns or it may include only those that are within a second larger defined distance from the position of the new agent pattern. This process of comparing the new agent pattern and descriptors with missing agent patterns may continue until the confidence score exceeds the threshold or until the new agent pattern has been compared to each of the missing agent patterns.

Figure 9:
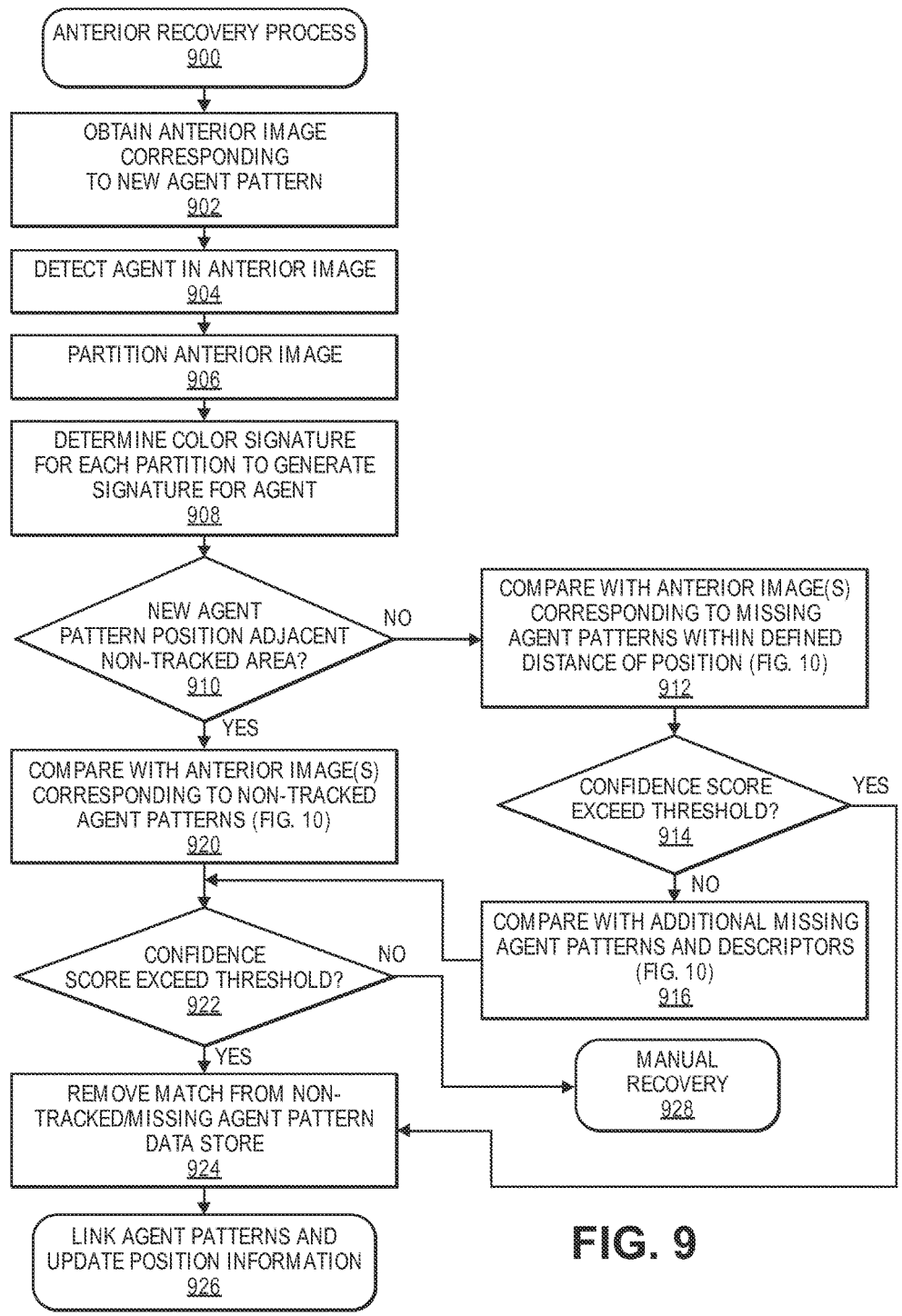
FIG. 9 is a flow diagram of an anterior recovery process, according to an implementation.

Returning to FIG. 7, after the new agent pattern and descriptors have been compared with the non-tracked agent patterns and descriptors (720) or after the new agent pattern and descriptors have been compared with additional missing agent patterns and descriptors (716), a determination is made as to whether the confidence score returned from the example process 800 exceeds a threshold, as in 722. If it is determined that the confidence score does not exceed the threshold, the example process 900 of recovering the agent based on anterior images is performed, as discussed below with respect to FIG. 9.

If it is determined at decision block 722 or decision block 714 that the returned confidence score does exceed the threshold, the missing agent pattern or non-tracked agent pattern determined to match the new agent pattern is removed from the missing patterns data store or the non-tracked agent patterns data store, as in 724. Likewise, the new agent pattern is linked to the missing agent pattern, or the non-tracked agent pattern that is determined to match the missing agent pattern, the position associated with the agent represented by the matching missing agent pattern or the non-tracked agent pattern is updated to correspond to the position of the new agent pattern, and tracking of the agent is resumed, as in 726.

Figure 8:
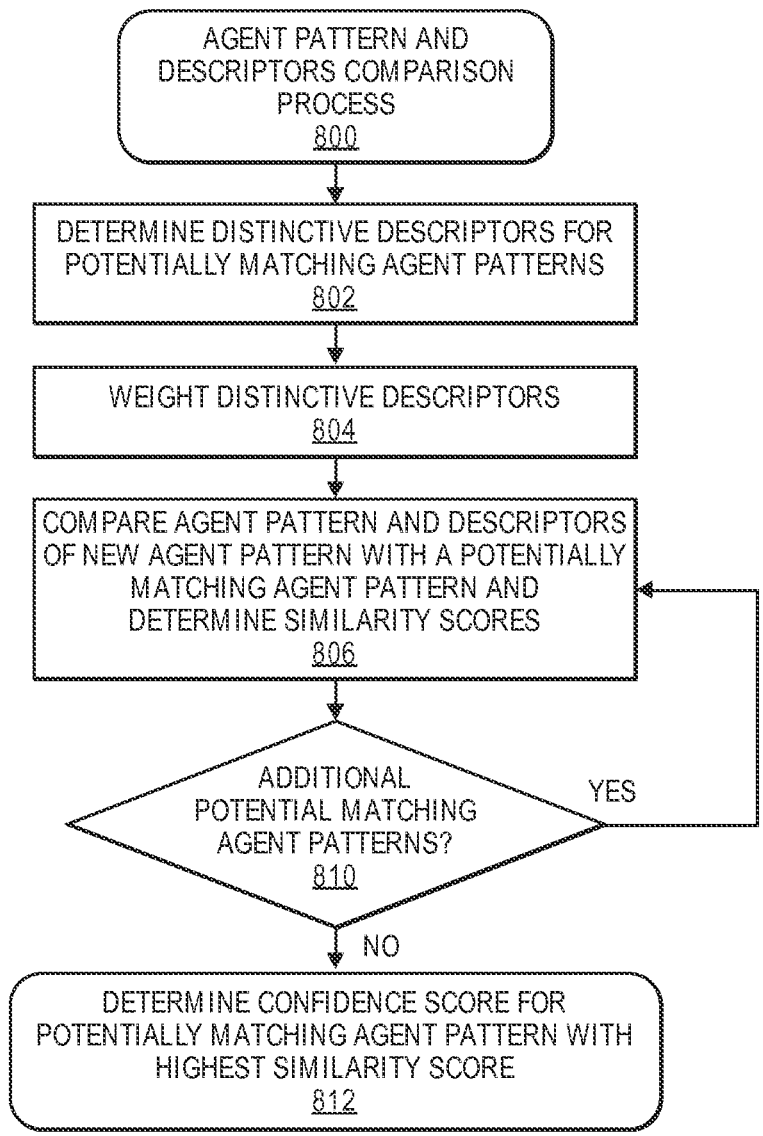
FIG. 8 is a flow diagram of an agent pattern and descriptors comparison process, according to an implementation.

FIG. 8 is a flow diagram of an example agent pattern and descriptors comparison process 800, according to an implementation. The agent pattern and descriptors comparison process may be utilized to determine distinguishing descriptors associated with potentially matching agent patterns (e.g., agent patterns identified in the missing agent patterns data store or agent patterns identified in the non-tracked agent patterns data store) and utilize those distinguishing descriptors to determine a confidence score indicating how confident a match has been determined.

The example process 800 begins by determining distinctive descriptors for potentially matching agent patterns, as in 802. For example, if a new agent pattern and corresponding descriptors are compared to agent patterns and descriptors stored in the non-tracked agent patterns data store, the potentially matching agent patterns may include all the agent patterns identified in the non-tracked agent patterns data store. As another example, if the new agent pattern and descriptors are being compared to agent patterns identified in the missing agent patterns data store, the potentially matching agent patterns may be missing agent patterns within a defined distance of the position of the new agent pattern. Alternatively, the potentially matching agent patterns may be all the missing agent patterns identified in the missing agent patterns data store.

Distinctive descriptors of potentially matching agent patterns may be determined by comparing the descriptors of the potentially matching agent patterns to identify those that are similar and those that are different. For example, if the potentially matching agent patterns are all employees of the materials handling facility and all of the employees are wearing similar uniforms (e.g., blue shirts), the descriptor for those agent patterns will not be distinctive as they will all be similar. In comparison, if one of the potentially matching agent patterns corresponds to an agent wearing a yellow shirt, the descriptor for that agent pattern may be determined to be distinctive. Descriptors may be compared using any one or more algorithms, such as a Random Forest Classifier and/or based on a Euclidean distance comparison based on height, color, etc. Other techniques for comparison may likewise be utilized.

Each descriptor that is determined to be distinctive for each agent pattern may be assigned a higher weight than the non-distinctive descriptors, so that, when the descriptors are compared with descriptors of the new agent pattern, those that are distinctive will be utilized to determine a similarity between the potentially matching agent pattern descriptors and the new agent pattern descriptors, as in 804.

The new agent pattern and corresponding descriptors are then compared to the descriptors of a potentially matching agent pattern and a similarity score is determined for each agent pattern, as in 806. The similarity score is representative of how similar the agent pattern and corresponding descriptors of the newly identified agent are to a stored agent pattern and descriptor.

A determination is also made as to whether there are any additional potentially matching agent patterns against which the descriptors of the new agent pattern are to be compared with the descriptors of the potentially matching agent pattern, as in 810. If it is determined that there are additional agent patterns against which descriptors are to be compared, the example process 800 returns to block 806 and continues. However, if it is determined that the descriptors for all the potentially matching agent patterns have been compared with the descriptors of the new agent pattern, a confidence score is determined for the potentially matching agent pattern with a highest similarity score, as in 812.

The confidence score represents a level of confidence that the potentially matching agent pattern with a highest similarity score corresponds to the new agent pattern. In some implementations, the confidence score may be determined based on a ratio of the similarity scores, based on a comparison of the highest similarity score with other high similarity scores, etc. For example, if the highest similarity score is 98%, the second highest similarity score is 25% and the third highest similarity score is 22%, the resulting confidence score may be high because the highest similarity score is high and there is a large difference between the highest similarity score and the next highest similarity score. As another example, if the highest similarity score is 98% and the next highest similarity score is 97%, the resulting confidence score that the potentially matching agent pattern corresponds to the new agent pattern may be low because either of the two potentially matching agent patterns could be the corresponding agent pattern.

While the example illustrated with respect to FIG. 8 describes determining confidence scores based on the ratio of the highest similarity scores, in other implementations, the similarity scores may be determined and, if a similarity score exceeds a threshold, it may be determined that the new agent pattern corresponds to the missing agent pattern with a highest similarity score.

If the newly identified agent pattern cannot be linked to a stored agent pattern by either example process 700 or example process 800, the anterior recovery process 900 may be utilized to match the newly identified agent pattern with a stored agent pattern—e.g., stored in the non-tracked agent patterns data store or the missing agent patterns data store.

Figure 11:
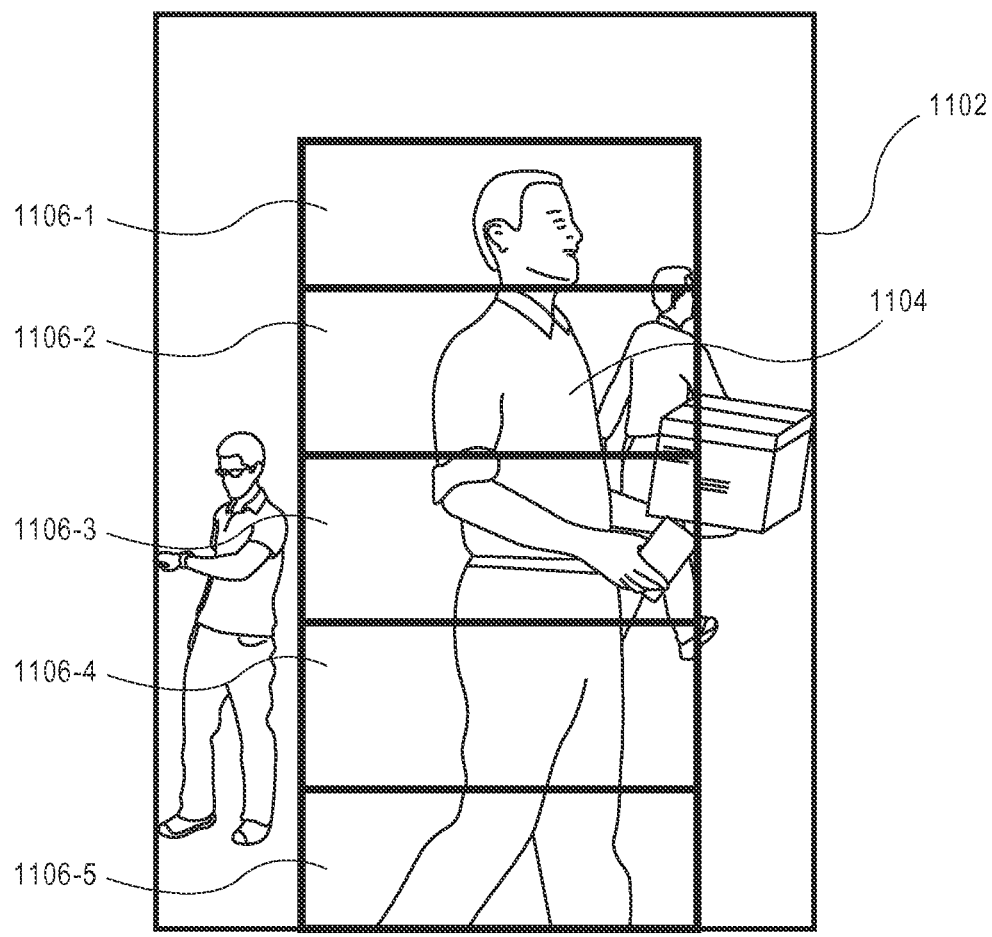
FIG. 11 is an illustration of a partitioned anterior image, according to an implementation.

The example process 900 begins by obtaining one or more anterior images corresponding to a newly identified agent pattern, as in 902. The anterior image may be obtained using an anterior camera oriented in a direction of the newly identified agent pattern and that includes an anterior view of an agent corresponding to the newly identified agent pattern. As discussed above, an "anterior image" or "anterior view" is intended to refer to any view of an agent other than an overhead view. For example, FIG. 11 is an anterior image 1102 obtained from an anterior camera positioned on an inventory shelf. The anterior image includes an anterior view or representation of an agent 1104.

The anterior cameras may include higher resolution images and/or higher pixel densities than the overhead cameras. In addition, because of the anterior view, additional features of the agent may be represented in the image data that can be used to compare the anterior images of the newly identified agent with stored anterior images corresponding to missing agent patterns, or missing agents.

The anterior image may be processed using one or more image processing algorithms to detect the agent represented in the anterior image, as in 904. For example, the anterior image may be processed using edge detection, object detection, and/or a color gradient algorithm to distinguish the agent represented in the image from background information. Based on the position of the detected agent in the anterior image, the portion of the anterior image that includes the agent is partitioned into two or more segments, as in 906. For example, the portion of the anterior image that includes the agent may be partitioned into five segments 1106-1.1106-2, 1106-3, 1106-4, 1106-5, as illustrated in FIG. 11. The partitions may be all of the same size and/or vary in size. For example, if there were four partitions, each partition may equally represent 25% of the portion of the anterior image that includes the representation of the agent. Alternatively, the partitions may vary in size. For example, the top partition 1106-1 may account for 15% of the total portion of the anterior image that includes the representation of the agent, partitions 1106-2, 1106-3 may each correspond to 25%, partition 1106-4 may correspond to 20%, and partition 1106-5 may correspond to 15% of the portion of the anterior image that includes a representation of the agent.

Returning to FIG. 9, for each partition (i) one or more algorithms, such as a k-means clustering algorithm, or other vector quantization algorithm, may be utilized to determine an adaptive color signature $s_i=\{\{c_1, c_2, \ldots, c_k\}, \{h_1, h_2, \ldots, h_k\}\}$, where $c_i$ is the cluster center i of the pixels assigned to the cluster, and $h_i$ is the portion of the pixels assigned to cluster i. The set of color signatures determined for the partitions of the anterior image form a visual representation of the agent: $S_1=\{s_1, s_2, \ldots, s_j\}$, referred to herein as agent color signatures, where j is the number of partitions and $s_j$ is a sub-signature of S. As an alternative, or in addition to using a vector quantizing algorithm, in some implementations, other processing techniques may be utilized to process each partition of the anterior image to generate color signatures for each partition. For example, each partition may be processed to generate a color signature based on a color histogram, using a texture detection algorithm, a feature detection algorithm, etc. Likewise, in some implementations, the partition that includes a representation of a head of the agent may be processed using one or more facial recognition algorithms.

In addition to generating a color signature from the anterior image corresponding to the newly identified agent pattern, a determination is made as to whether a position associated with the new agent pattern is adjacent to an entry or exit of a non-tracked area, as in 910. If the agent pattern is adjacent to a non-tracked area, the agent represented by the new agent pattern may correspond to an agent that previously entered the non-tracked area and whose tracking has been lost.

If it is determined that the new agent pattern is adjacent to a non-tracked area, the color signature of the anterior image corresponding to the new agent pattern is compared with color signatures determined for agent patterns identified in the non-tracked agent patterns data store, as in 920. Comparing the color signature of an anterior image corresponding to a new agent pattern with color signatures of stored anterior images corresponding to stored agent patterns included in the non-tracked agent patterns data store is discussed further below with respect to FIG. 10.

If it is determined that the new agent pattern is not adjacent to a non-tracked area, the color signature for the new agent pattern is compared with color signatures determined for stored anterior images corresponding to stored agent patterns identified in the missing agent patterns data store that are within a defined distance of the new agent pattern, as in 912. The defined distance may consider both the distance between the last known position of a missing agent pattern as well as the time at which the position of the missing agent pattern became not current. The longer an agent has been missing, the larger the area in which the missing agent may be located. As such, the defined distance may be different for different missing agent patterns. For example, an agent pattern that has been missing five seconds may have a small defined distance and only be considered if it is within that defined distance of the newly identified agent pattern. In comparison, an agent pattern that has been missing for five minutes will have a larger defined distance (because the agent could have moved farther during that amount of time) and will be considered if the position of the newly identified agent pattern is within that defined distance. Comparing the color signature of an anterior image corresponding to new agent pattern with color signatures of stored anterior images corresponding to stored agent patterns included in the missing agent patterns data store is discussed further below with respect to FIG. 10.

Based on the comparison of the color signature of an anterior image corresponding to the new agent pattern with color signatures determined for stored anterior images that correspond with agent patterns stored in the missing agent patterns data store that are within a defined distance of the position of the new agent pattern, as described below with respect to FIG. 10, a confidence score is returned and a determination is made as to whether the returned confidence score exceeds a threshold, as in 914. If it is determined that the confidence score does not exceed the threshold, the color signature for the anterior image corresponding to the new agent pattern may be compared with color signatures for anterior images corresponding to additional agent patterns maintained in the missing agent patterns data store, as in 916. Depending on the number of agent patterns identified in the missing agent patterns data store, the additional missing agent patterns may include all the additional missing agent patterns or it may include only those that are within a second larger defined distance from the position of the new agent pattern. This process of comparing a color signature of an anterior image corresponding to the new agent pattern with color signatures of anterior images corresponding to missing agent patterns may continue until the confidence score exceeds the threshold or until the color signature of the anterior image corresponding to the new agent pattern has been compared to each of the color signatures determined for anterior images that correspond to missing agent patterns.

Returning to FIG. 9, after the color signature of the anterior image corresponding to the new agent pattern has been compared with the color signatures of the anterior images corresponding to non-tracked agent patterns (920) or after the color signature of the anterior image corresponding to the new agent pattern has been compared with color signatures of anterior images corresponding to additional missing agent patterns and descriptors (916), a determination is made as to whether the confidence score returned from the example process 1000 (FIG. 10) exceeds a threshold, as in 922. If it is determined that the confidence score does not exceed the threshold, a manual review of the agent patterns, overhead images, and/or anterior images may be performed in an effort to associate the new agent pattern with a missing agent pattern, as in 928.

In some implementations, the example process 900 may identify the top group of missing agent patterns that include corresponding anterior images that have a highest similarity with the anterior image corresponding to the new agent pattern. For example, comparing anterior images based on color signatures may result in 99.9999% confidence match that the new agent pattern corresponds to one of four missing agent patterns. In such an implementation, rather than providing just the newly identified agent pattern and corresponding images for manual review and comparison with all missing agent patterns, the example process 900 may provide the new agent pattern and only the top four missing agent patterns, as determined by the anterior recovery process 900. By reducing the set of potential candidate missing agent patterns for manual review, a human review time of comparing the new agent pattern and corresponding images with missing agent patterns is reduced. Likewise, the potential for error in a manual review is also reduced.

If it is determined at decision block 922 or decision block 914 that the returned confidence score does exceed the threshold, the missing agent pattern or non-tracked agent pattern determined to match the new agent pattern is removed from the missing pattern data store or the non-tracked agent patterns data store, as in 924. Likewise, the new agent pattern is linked to the missing agent pattern, or the non-tracked agent pattern that is determined to match the missing agent pattern, the position associated with the agent represented by the matching missing agent pattern or the non-tracked agent pattern is updated to correspond to the position of the new agent pattern, and tracking of the agent is resumed, as in 926.

Figure 10:
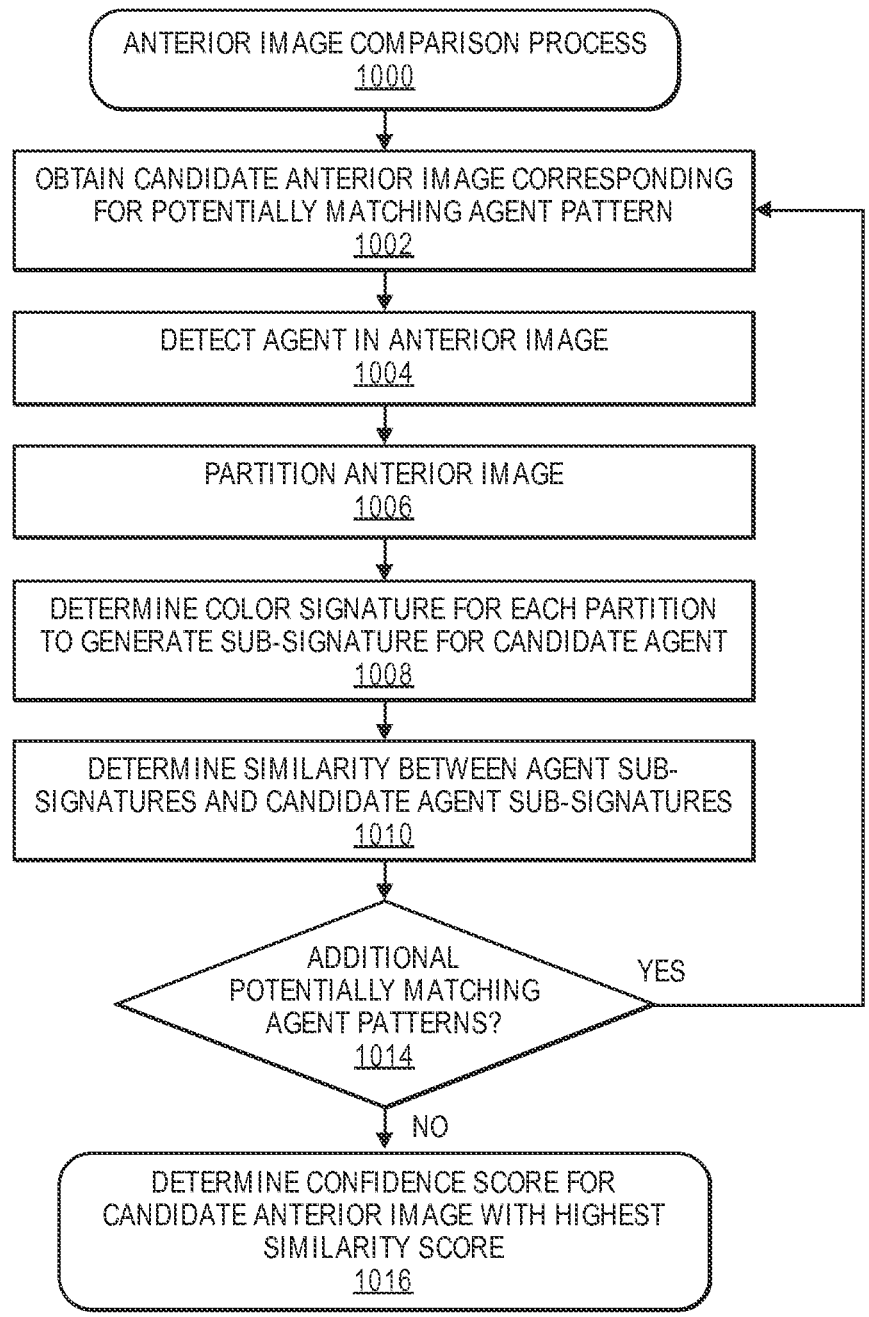
FIG. 10 is a flow diagram of an anterior image comparison process, according to an implementation.

FIG. 10 is a flow diagram of an example anterior image comparison process 1000, according to an implementation. The example process 1000 begins by obtaining a candidate anterior image corresponding to a potentially matching agent pattern, as in 1002. A potentially matching agent pattern may include all the agent patterns identified in the non-tracked agent patterns data store. Alternatively, a potentially matching agent pattern may be a missing agent pattern within a defined distance of the position of the new agent pattern. Alternatively, the potentially matching agent pattern may be any missing agent pattern identified in the missing agent patterns data store.

The obtained candidate anterior image may be processed using one or more image processing algorithms to detect the agent represented in the candidate anterior image, as in 1004. For example, the anterior image may be processed using edge detection, object detection, and/or a color gradient algorithm to distinguish the agent represented in the image from background information. Based on the position of the detected agent in the candidate anterior image, the portion of the candidate anterior image that includes the agent is partitioned into two or more segments, as in 1006. For example, the portion of the candidate anterior image that includes the agent may be partitioned in a manner similar to that discussed above with respect to partitioning a candidate anterior image in FIG. 9. Similar to the discussion presented in FIG. 9, for each partition (i) one or more algorithms, such as a k-means clustering algorithm, or other vector quantization algorithm, may be utilized to determine an adaptive color signature $s_i=\{\{c_1, c_2, \ldots, c_k\}, \{h_1, h_2, \ldots, h_k\}\}$ for each partition of the candidate anterior image, as in 1008. As an alternative, or in addition to using a vector quantizing algorithm, in some implementations, other processing techniques may be utilized to process each partition of the anterior image. For example, each partition may be processed to generate a color histogram, using a texture detection algorithm, a feature detection algorithm, etc. Likewise, in some implementations, the partition that includes a representation of a head of the agent may be processed using one or more facial recognition algorithms.

When using a vector quantization algorithm, the set of color signatures determined for the partitions of the candidate anterior image form a visual representation of the candidate agent is: $S_2=\{s_1, s_2, \ldots, s_j\}$.

A similarity is then determined between the color signature $(S_1)$ of the anterior image corresponding to the new agent and the color signature $(S_2)$ of the candidate anterior image corresponding to the missing agent, as in 1010. For example, an algorithm, such as the earth mover's distance (EMD), may be used to measure the distance between the two probability distributions. For example, using EMD the distance between each pair of sub-signatures, where n is the number of partitions:

$$EMD_j(s_{1j}, s_{2j}) = \min_{f_{kl}} \sum_{k=1}^{n}\sum_{l=1}^{n} f_{op}|c_{1jk} - c_{2jl}|$$

$$\text{s.t.} \ f_{kl} \geq 0, 0 \leq k, l \leq n$$

$$\sum_{k=1}^{n} f_{kl} \leq h_{1jk}.$$

The final similarity (D) between the color signature of the anterior image corresponding to the new agent pattern and the color signature of the candidate anterior image is the weighted combination of all the EMD distances from all partitions:

$$D(S_1, S_2) = \Sigma_{j=1}^{n} w_j EMD_j(s_{ij}, s_{2j})$$

In some implementations, one or more of the sub-signatures may be weighted compared to other sub-signatures of an agent color signature. For example, a partition that includes a representation of a head or a torso region of the agent may be given a higher weight than other partitions of the anterior image. In other implementations, a partition have a higher variation in color, texture or other distinctive features may be given a higher weight.

Returning to FIG. 10, a determination is also made as to whether there are any additional potentially matching agent patterns against which the color signatures of anterior images are to be compared, as in 1014. If it is determined that there are additional agent patterns against which color signatures are to be compared, the example process 1000 returns to block 1002 and continues. However, if it is determined that color signatures of all candidate anterior images corresponding to all the potentially matching agent patterns have been compared with color signatures of an anterior image corresponding to the new agent, a confidence score is determined for the potentially matching agent pattern with a corresponding anterior image having a highest similarity color signature, as in 1016.

The confidence score represents a level of confidence that the potentially matching agent pattern with a highest similarity score corresponds to the new agent pattern. As discussed above, in some implementations, the confidence score may be determined based on a ratio of the similarity scores, based on a comparison of the highest similarity score with other high similarity scores, etc. While this example describes determining confidence scores based on the ratio of the highest similarity scores, in other implementations, the similarity scores may be determined and, if a similarity score exceeds a threshold, it may be determined that the new agent pattern corresponds to the missing agent pattern with a highest similarity score.

Figure 12:
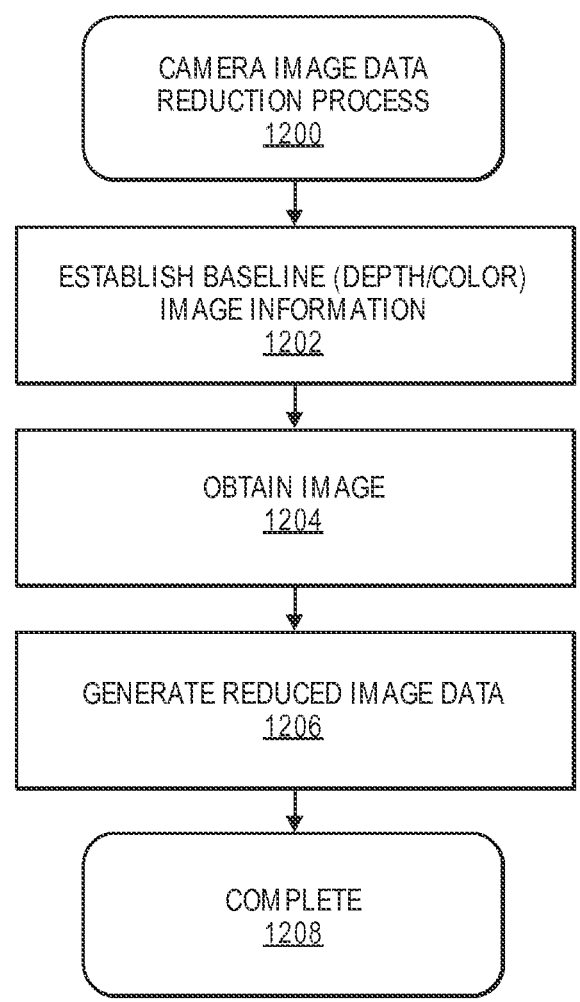
FIG. 12 is a flow diagram of an example image data reduction process, according to an implementation.

FIG. 12 is a flow diagram of an example camera image data reduction process 1200, according to an implementation. The example process 1200 may be performed for each camera, for each camera within a cluster and/or for each cluster. In some implementations, the example process 1200 may be performed using computing components of the camera itself as part of the image capture process. In other implementations, obtained images may be sent from the camera to a camera computing component and the camera computing component may perform the example process 1200. Cameras may be connected to the camera computing component via wired or wireless communication paths. In some implementations, the cameras may be connected with a camera computing component over a wired Ethernet connection or a wired universal serial bus (USB) connection. In addition to providing image data to the camera computing component over such a wired connection, the camera may be powered by the camera computing component and receive power over the wired connection (e.g., power over Ethernet or power over USB).

Multiple cameras of a cluster may provide image data to a camera computing component for processing. Each camera computing component may support, for example, twenty four cameras, receive image data from those cameras and generate reduced image data for each camera, in accordance with the example process 1200. In other implementations, more or fewer cameras may be supported by a camera computing component.

The example process 1200 begins by establishing baseline image information for each location of the materials handling facility, as in 1202. For example, baseline image information may include the depth information for each location within the materials handling facility with respect to a camera, color information, temperature information, etc. In one implementation, each camera may obtain images and determine from those images areas within the field of view that remain unchanged in the image. These areas may be established as baseline image information. This may be done at initiation of the system when there is no activity in the materials handling facility and/or periodically.

For example, when there is no activity in the materials handling facility (e.g., no agents), the example process 1200 may be performed and the baseline image information may include a representation of the field of view of each camera when there is no activity. In other implementations, the example process 1200 may be performed while there is activity in the materials handling facility. For example, a series of image data from a camera may be processed to determine locations that are not changing. This may correspond to baseline image information obtained when the materials handling facility has no activity or it may vary with time. For example, if an agent picks an item from an inventory location and then returns the item to the inventory location but does not place it entirely back onto a shelf of the inventory location, a portion of the item may be included in images obtained by a camera. The change in the depth information for the pixels corresponding to the location of the item will change compared to an existing baseline image. However, because the item is stationary, the depth information for each subsequent image data will be similar. After a defined period of time (e.g., five minutes), the example process may determine that the item should be considered part of the baseline and the depth information for the pixels that represent the item may be updated so that the depth information corresponding to the item is part of the baseline.

In addition to establishing a baseline, images may be periodically obtained by the cameras, as in 1204. The cameras may obtain a series of still images and/or ongoing video from which frames are extracted as image data. For each obtained image, the image data is compared with the baseline image information and pixels with the same or similar information are removed. The remaining pixels, the pixels having information that is different than the baseline image information, are saved to generate reduced image data, as in 1206. In some implementations, pixel information (e.g., color, depth, temperature) may be considered to be the same if the difference between the baseline image information and the current image data are within a tolerance threshold. Due to lighting changes, vibrations, temperature changes, etc., there may be some variation between the baseline image information and the image data. Such variations may fall below a tolerance threshold and not be considered as changes to the pixel information. The tolerance threshold may be any defined value and may be the same or different for different pixels, different cameras, different clusters, etc.

The reduced image data may be used as part of various processes, as discussed herein. Upon generating the reduced image data, the example process 1200 completes, as in 1208.

Figure 13:
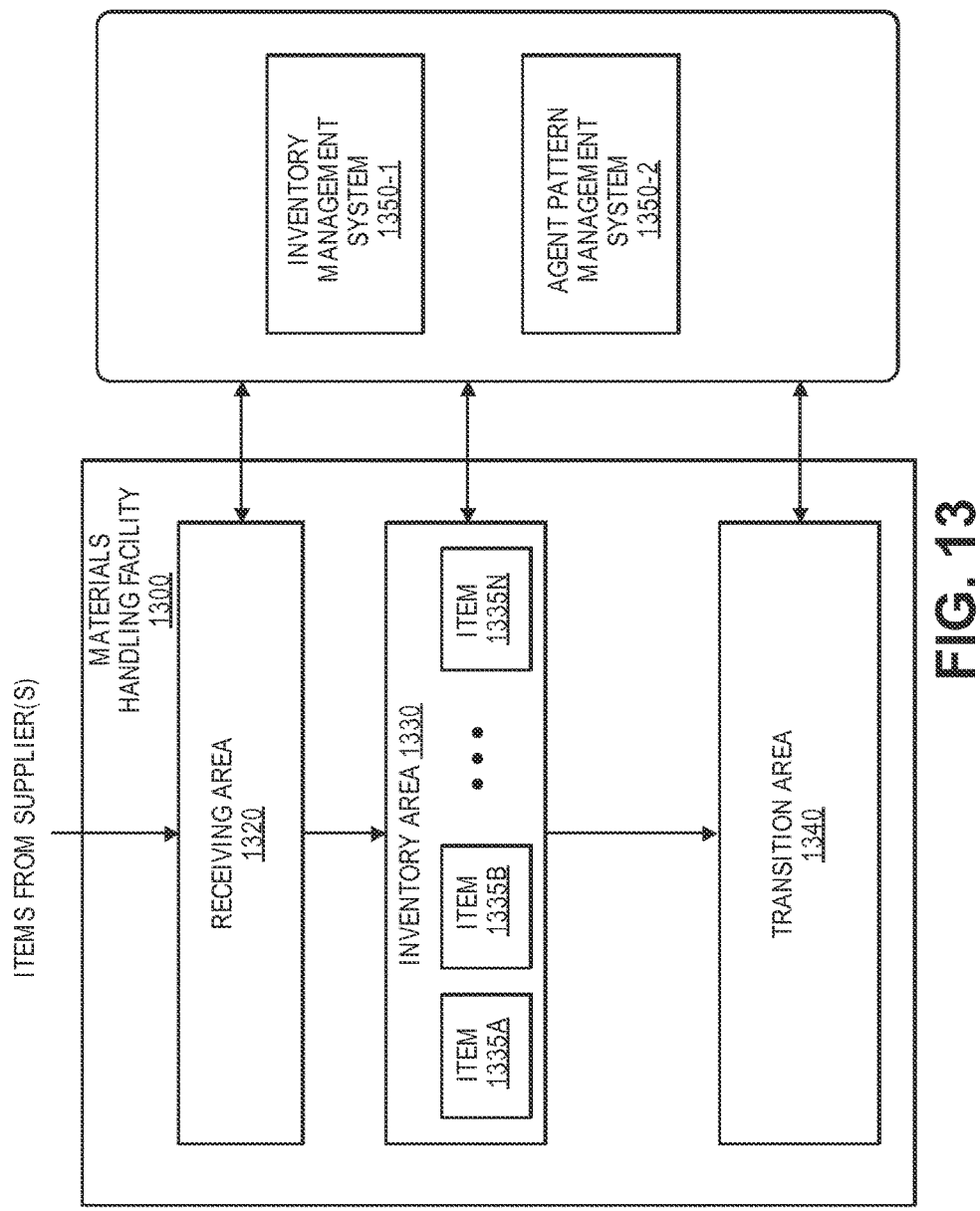
FIG. 13 is a block diagram illustrating a materials handling facility, according to an implementation.

An implementation of a materials handling facility configured to store and manage inventory items is illustrated in FIG. 13. As shown, a materials handling facility 1300 includes a receiving area 1320, an inventory area 1330 configured to store an arbitrary number of inventory items 1335A-1335N, and one or more transition areas 1340. The arrangement of the various areas within materials handling facility 1300 is depicted functionally rather than schematically. For example, in some implementations, multiple different receiving areas 1320, inventory areas 1330 and/or transition areas 1340 may be interspersed rather than segregated. Additionally, the materials handling facility 1300 includes an inventory management system 1350-1 configured to interact with each of receiving area 1320, inventory area 1330, transition area 1340 and/or agents within the materials handling facility 1300. Likewise, the materials handling facility includes an agent pattern management system 1350-2 configured to interact with image capture devices, such as overhead cameras and/or anterior cameras, at each of the receiving area 1320, inventory area 1330, and/or transition area 1340 and to track agents as they move throughout the materials handling facility 1300.

The materials handling facility 1300 may be configured to receive different kinds of inventory items 1335 from various suppliers and to store them until an agent retrieves one or more of the items. The general flow of items through the materials handling facility 1300 is indicated using arrows. Specifically, as illustrated in this example, items 1335 may be received from one or more suppliers, such as manufacturers, distributors, wholesalers, etc., at receiving area 1320. In various implementations, items 1335 may include merchandise, commodities, perishables, or any suitable type of item depending on the nature of the enterprise that operates the materials handling facility 1300.

Upon being received from a supplier at receiving area 1320, items 1335 may be prepared for storage. For example, in some implementations, items 1335 may be unpacked or otherwise rearranged and the inventory management system (which, as described, may include one or more software applications executing on a computer system) may be updated to reflect the type, quantity, condition, cost, location or any other suitable parameters with respect to newly received items 1335. It is noted that items 1335 may be stocked, managed or dispensed in terms of countable, individual units or multiples of units, such as packages, cartons, crates, pallets or other suitable aggregations. Alternatively, some items 1335, such as bulk products, commodities, etc., may be stored in continuous or arbitrarily divisible amounts that may not be inherently organized into countable units. Such items 1335 may be managed in terms of measurable quantities, such as units of length, area, volume, weight, or other dimensional properties characterized by units of measurement. Generally speaking, a quantity of an item 1335 may refer to either a countable number of individual or aggregate units of an item 1335 or a measurable amount of an item 1335, as appropriate.

After arriving through receiving area 1320, items 1335 may be stored within inventory area 1330 on an inventory shelf. In some implementations, like items 1335 may be stored or displayed together in bins, on shelves or via other suitable storage mechanisms, such that all items 1335 of a given kind are stored in one location. In other implementations, like items 1335 may be stored in different locations. For example, to optimize retrieval of certain items 1335 having high turnover or velocity within a large physical facility, those items 1335 may be stored in several different locations to reduce congestion that might occur at a single point of storage.

When an order specifying one or more items 1335 is received, or as an agent progresses through the materials handling facility 1300, the corresponding items 1335 may be selected or "picked" (an event) from the inventory area 1330. For example, in one implementation, an agent may have a list of items to pick and may progress through the materials handling facility picking items 1335 from the inventory area 1330. In other implementations, an agent may pick items 1335 using written or electronic pick lists derived from orders. In some instances, an item may need to be repositioned from one location within the inventory area 1330 to another location. For example, in some instances, an item may be picked from its inventory location, moved a distance and placed (an event) at another location. An "event," as used herein, is a detected movement of an item. For example, an event may be a detected movement of an item when the item is picked from an inventory location or a detected movement of an item when the item is placed at an inventory location.

As discussed herein, as the agent moves through the materials handling facility, images of the agent may be obtained and processed by the agent pattern management system 1350-2 to determine an agent pattern representative of the agent and to track a position of the agent as the agent moves. Likewise, in some implementations, descriptors representative of the agent may be periodically determined for the agent from the obtained images as the agent moves about the materials handling facility.

Figure 14:
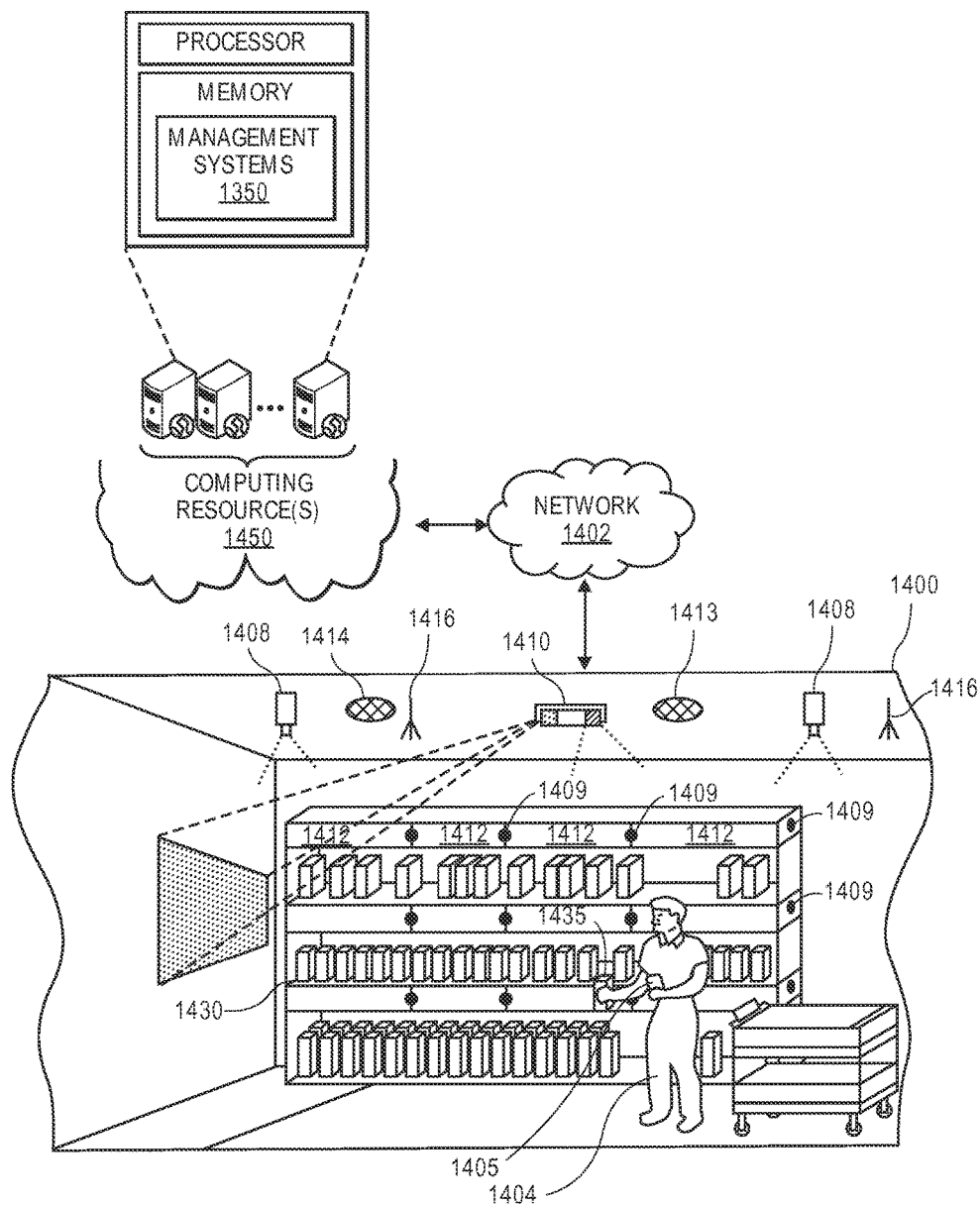
FIG. 14 shows additional components of the materials handling facility of FIG. 13, according to an implementation.

FIG. 14 shows additional components of a materials handling facility 1400, according to one implementation. Generally, the materials handling facility 1400 may include one or more image capture devices 1408, 1409, such as overhead cameras and anterior cameras. In some implementations, the overhead image capture devices 1408 may be positioned overhead, such as on the ceiling, and oriented toward a surface (e.g., floor) of the materials handling facility so that the overhead image capture devices 1408 are approximately perpendicular with the surface and the field of view is oriented toward the surface. The overhead image capture devices 1408 are used to capture images of agents and/or locations within the materials handling facility from an overhead or top-down view. Likewise, one or more anterior image capture devices 1409 may be positioned on, inside, or adjacent to inventory areas and/or otherwise positioned and oriented so that an inventory location is within a field of view of the anterior image capture device 1409. For example, a series of anterior image capture devices 1409 may be positioned on external portions of inventory areas and oriented to capture images of agents and/or other inventory locations (e.g., those on an opposite side of an aisle). In some implementations, anterior image capture devices 1409 may be arranged throughout the materials handling facility such that each inventory location is within a field of view of at least two anterior image capture devices 1409.

Any type of image capture device and/or configuration of image capture devices may be used with the implementations described herein. For example, one or more of the image capture devices may be a red, green, blue ("RGB") color camera, still camera, motion capture/video camera, etc. In other implementations, one or more of the image capture devices may be depth sensing cameras, also referred to herein as a RGBD camera. For example, the overhead image capture devices 1408 may each be depth sensing image capture devices and the anterior image capture devices 1409 may be color based (RGB) cameras.

In still other implementations, one or more of the image capture devices may be a thermographic or infrared (IR) camera, etc. In some implementations, the image capture devices may simply be camera modules that include a lens and an image sensor. The image sensor may convert an optical image obtained by the lens of the camera into a digital signal or digital representation of the image (generally referred to herein as image data). In one implementation, the image sensor may be a RGB sensor capable of supporting an image resolution of at least 860×480 at six frames per second. The image sensor may likewise be configured to provide the image data to other components (e.g., a graphics processing unit) for processing and/or other systems, such as the agent pattern management system 1350-2. In some implementations, image capture devices may be paired to provide stereo imagery and depth values indicating a distance between the paired image capture device and an object being imaged. A stereo camera may include a pair of image capture device modules. Image data may be stored in any variety of formats including, but not limited to, YUYV, RGB, RAW. HEX, HSV, HLS, CMYK, bmp, jpeg, etc.

Cameras operate by electronically capturing reflected light from objects and assigning quantitative values to one or more aspects of the reflected light, such as pixels. A camera may include one or more sensors having one or more filters associated therewith. The sensors of a camera may capture information regarding any number of pixels of the reflected light corresponding to one or more base colors (e.g., red, green, or blue) expressed in the reflected light, and store values associated with the pixel colors as image data and/or transmit image data to another device for further analysis or reproduction. The camera may also be configured to determine depth values, such as the distance between the camera and an object in the field of view of the camera. Depth values may be included in or provided with the image data generated by the camera.

Information and/or data regarding features or objects represented in a digital image may be extracted from the image in any number of ways. For example, a color of a pixel or a group of pixels in image data may be determined and quantified according to one or more standards. e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Moreover, a texture of a feature or object expressed in a digital image may be identified using one or more computer-based methods, such as by identifying changes in intensities within regions or sectors of the image, or by defining areas of an image corresponding to specific surfaces. Furthermore, outlines of objects may be identified in a digital image using one or more algorithms or machine-learning tools. For example, some such algorithms or tools may recognize edges, contours or outlines of objects in the digital image, or of portions of objects, and may match the edges, contours or outlines of the objects against a database containing information regarding edges, contours or outlines of known objects.

In addition to cameras, other input devices, such as pressure sensors, infrared sensors, scales, light curtains, load cells, RFID readers, etc., may be utilized with the implementations described herein. For example, a pressure sensor and/or a scale may be used to detect the presence or absence of items and/or to determine when an item is added and/or removed from inventory areas. Likewise, an RFID reader that can detect a tag included on an item as the item passes into or out of the inventory location may be utilized to detect the presence or absence of an item. For example, if the item includes an RFID tag, an RFID reader may detect the RFID tag as the item passes into or out of the inventory location. Alternatively, or in addition thereto, the inventory shelf may include one or more antenna elements coupled to an RFID reader that are configured to read RFID tags of items located on the inventory shelf.

When an agent 1404 arrives at the materials handling facility 1400, one or more overhead images of the agent 1404 may be captured and processed using overhead cameras 1408 and/or the management systems 1350. For example, the images of the agent 1404 may be processed to identify the agent. This may be done using a variety of techniques, such as object recognition, pattern matching, etc. In some implementations, rather than or in addition to processing images to identify the agent 1404, other techniques may be utilized to identify the agent. For example, the agent may provide an identification (e.g., agent name, password), the agent may present an identifier (e.g., identification badge, card), an RFID tag in the possession of the agent may be detected, a visual tag (e.g., barcode, bokode, watermark) in the possession of the agent may be detected, etc.

The captured images and/or other inputs may also be used to establish an agent pattern for the agent 1404 while located in the materials handling facility 1400. In various implementations, the agent patterns are determined from the overhead image capture devices 1408. As the agent moves, the position and orientation of the agent pattern is updated and is used to track the agent as the agent moves throughout the materials handling facility.

In addition to establishing an agent pattern when the agent first arrives at the materials handling facility and is identified, one or more descriptors representative of the agent or the agent pattern may be determined. In some implementations, the determined agent patterns of the agent may be stored and maintained as representative of the agent and used at a later point in time to identify the agent (e.g., when the agent returns to the materials handling facility on a different date). In comparison, the descriptors may only be stored for a limited period of time and used to identify the agent during the current time they are in the materials handling facility. When the agent exits the materials handling facility, the descriptors may be discarded.

Returning to FIG. 14, in some implementations, an agent located in the materials handling facility 1400 may possess a portable device 1405 and obtain information about items located within the materials handling facility 1400, receive confirmation that the inventory management system has correctly identified items that are picked and/or placed by the agent, receive requests for confirmation regarding one or more event aspects, etc. Generally, the portable device has at least a wireless module to facilitate communication with the management systems 1350 (e.g., the inventory management system) and a display (e.g., a touch based display) to facilitate visible presentation to and interaction with the agent. The portable device 1405 may store a unique identifier and provide that unique identifier to the management systems 1350 and be used to identify the agent. In some instances, the portable device may also have other features, such as audio input/output (e.g., speaker(s), microphone(s)), video input/output (camera(s), projector(s)), haptics (e.g., keyboard, keypad, touch screen, joystick, control buttons) and/or other components.

In some instances, the portable device may operate in conjunction with or may otherwise utilize or communicate with one or more components of the management systems 1350. Likewise, components of the management systems 1350 may interact and communicate with the portable device as well as identify the agent, communicate with the agent via other means and/or communicate with other components of the management systems 1350.

Generally, the management systems 1350 may include one or more input/output devices, such as imaging devices (e.g., cameras) 1408, projectors 1410, displays 1412, speakers 1413, microphones 1414, illumination elements (e.g., lights), etc., to facilitate communication between the management systems 1350 and/or the agent and detection of items, events and/or other actions within the materials handling facility 1400. In some implementations, multiple input/output devices may be distributed within the materials handling facility 1400. For example, there may be multiple imaging devices, such as overhead cameras located on the ceilings and/or anterior cameras located in the aisles near the inventory items.

Likewise, the management systems 1350 may also include one or more communication devices, such as wireless antennas 1416, which facilitate wireless communication (e.g., Wi-Fi, Near Field Communication (NFC), Bluetooth) between the management systems 1350 and other components or devices. The management systems 1350 may also include one or more computing resource(s) 1450, such as a server system, that may be local to the environment (e.g., materials handling facility), remote from the environment, or any combination thereof.

The management systems 1350 may utilize antennas 1416 within the materials handling facility 1400 to create a network 1402 (e.g., Wi-Fi) so that the components and devices can connect to and communicate with the management systems 1350. For example, when the agent picks an item 1435 from an inventory area 1430, a camera may detect the removal of the item and the management systems 1350 may receive information, such as image data of the performed action (item pick from the inventory area), identifying that an item has been picked from the inventory area 1430. The event aspects (e.g., agent identity, action performed, item involved in the event) may then be determined by the management systems 1350.

Figure 15:
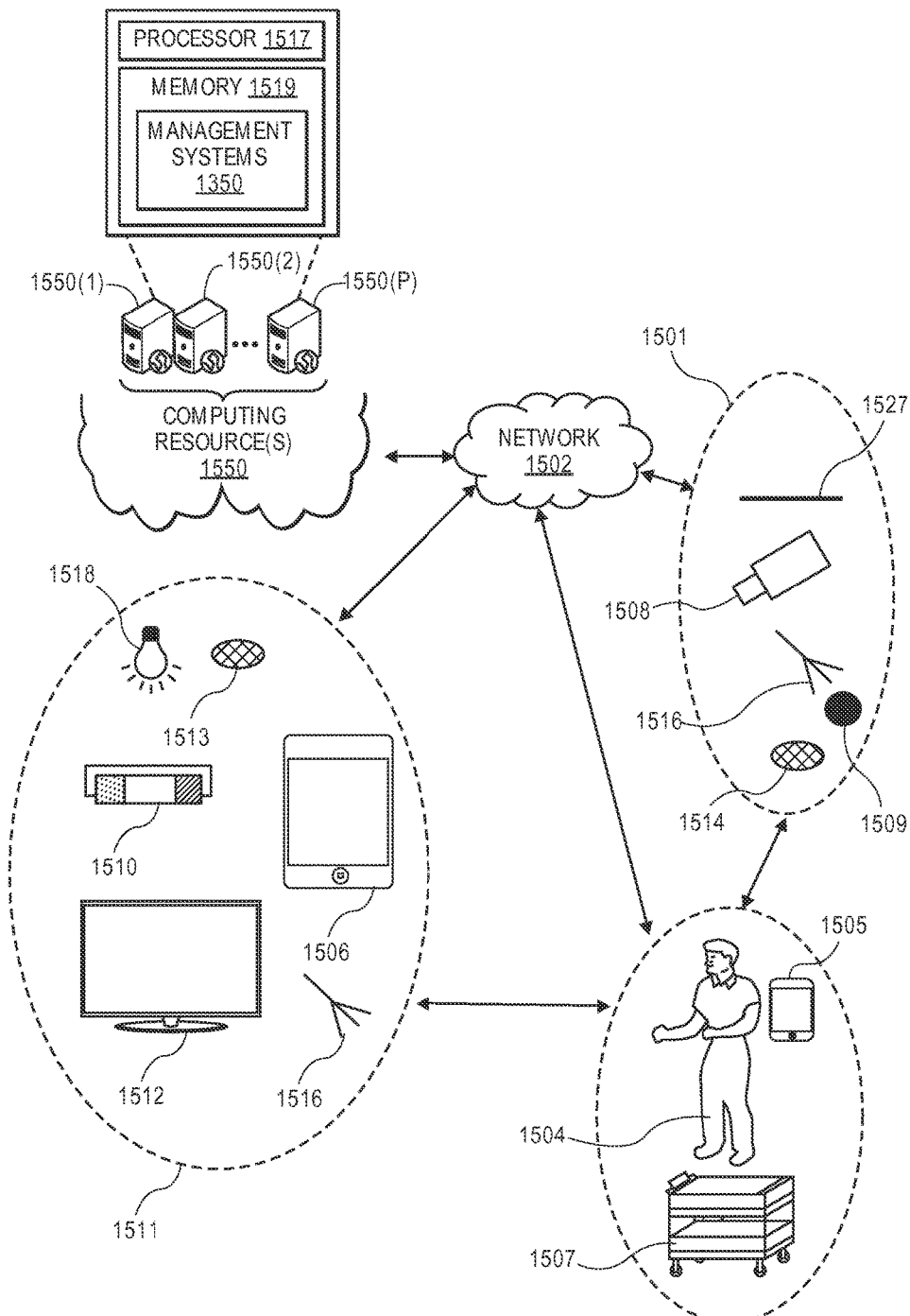
FIG. 15 shows components and communication paths between component types utilized in a materials handling facility of FIG. 13, according to an implementation.

FIG. 15 shows example components and communication paths between component types utilized in a materials handling facility 1300, in accordance with one implementation. A portable device 1505 may communicate and interact with various components of management systems 1350 over a variety of communication paths. Generally, the management systems 1350 may include input components 1501, output components 1511 and computing resource(s) 1550. The input components 1501 may include an overhead imaging device 1508, anterior imaging device 1509, a multiple-camera apparatus 1527, microphone 1514, antenna 1516, or any other component that is capable of receiving input about the surrounding environment and/or from the agent. The output components 1511 may include a projector 1510, a portable device 1506, a display 1512, an antenna 1516, a radio (not shown), speakers 1513, illumination elements 1518 (e.g., lights), and/or any other component that is capable of providing output to the surrounding environment and/or the agent.

The management systems 1350 may also include computing resource(s) 1550. The computing resource(s) 1550 may be local to the environment (e.g., materials handling facility), remote from the environment, or any combination thereof. Likewise, the computing resource(s) 1550 may be configured to communicate over a network 1502 with input components 1501, output components 1511 and/or directly with the portable device 1505, an agent 1504 and/or the tote 1507.

As illustrated, the computing resource(s) 1550 may be remote from the environment and implemented as one or more servers 1550(1), 1550(2), . . . , 1550(P) and may, in some instances, form a portion of a network-accessible computing platform implemented as a computing infrastructure of processors, storage, software, data access, and so forth that is maintained and accessible by components/devices of the management systems 1350 and/or the portable device 1505 via a network 1502, such as an intranet (e.g., local area network), the Internet, etc. The server system 1550 may process images of agents to identify the agent, process images of items to identify items, determine a location of items and/or determine a position of items. The server system(s) 1550 does not require end-agent knowledge of the physical location and configuration of the system that delivers the services. Common expressions associated for these remote computing resource(s) 1550 include "on-demand computing," "software as a service (SaaS)," "platform computing," "network-accessible platform," "cloud services," "data centers," and so forth.

Each of the servers 1550(1)-(P) include a processor 1517 and memory 1519, which may store or otherwise have access to management systems 1350, which may include or provide image processing (e.g., for agent identification, item identification, etc.), inventory tracking, and/or location determination.

The network 1502 may utilize wired technologies (e.g., wires, USB, fiber optic cable, etc.), wireless technologies (e.g., radio frequency, infrared, NFC, cellular, satellite, Bluetooth, etc.), or other connection technologies. The network 1502 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

The various sensors and computer systems described above may collect a wide variety of data relating to agents of systems or facilities employing such sensors or computer systems. The data relating to agents may include, for example, images, video, location information, travel patterns, personal identification information, transaction history information, agent preferences, and the like. The sensors, systems, and techniques described herein would be typically configured to process this information in a manner that ensures compliance with all appropriate laws, regulations, standards, and the like.

FIG. 16 is a block diagram of an overhead view of a cluster 1660, according to an implementation. A cluster may represent a segment of a materials handling facility 1300. In some implementations, a single materials handling facility may include a plurality of clusters. In other implementations, a single cluster may be used to cover an entire materials handling facility.

Within each cluster 1660, a plurality of cameras 1608 may be positioned overhead (e.g., on a ceiling), referred to herein as overhead cameras or overhead image capture devices, at defined locations so that the collective field of view of the cameras covers the entire surface of the portion of the materials handling facility corresponding to the cluster 1660. In some implementations, a grid 1602 system, physical or virtual, is oriented with the shape of the materials handling facility (e.g., oriented with the walls of the materials handling facility). The grid 1602 may be utilized to attach or mount cameras within the cluster 1660 at defined locations with respect to the physical space of the materials handling facility. For example, in some implementations, the cameras may be positioned at any one foot increment from other cameras along the grid.

By mounting the cameras overhead at defined locations along the grid, the cameras can be associated with physical coordinates, also referred to herein as real world positions, within the materials handling facility. For example, if the cluster 1660 represents the north-west corner of a materials handling facility, the grid 1602 may be segmented into columns and rows and cameras may be positioned at any point on the grid. The columns and rows may be identified using any nomenclature, such as alphabetical characters for columns and numeric characters for rows. Each column:row intersection is at a defined physical location within the materials handling facility. For example, if the grid is positioned in one foot by one foot increments, the physical location within the materials handling facility of every grid intersection and any connected cameras is known. In this example, camera 1608A is positioned at grid coordinate B:3, which corresponds to the horizontal coordinate of the camera being positioned approximately two feet by three feet from the origin (in this example the upper left corner) of the cluster.

Because the field of view 1604 of the cameras 1608 may not be circular, the cameras may be placed at defined directions (e.g., 0, 90, 180, 270 degrees). The direction of the camera may be determined based on the field of view 1604 coverage of adjacent cameras and/or the layout of objects on the surface of the materials handling facility. For example, if the camera 1608 is being mounted above an aisle between two inventory locations, the direction of the camera may be set so that the larger portion of the field of view 1604 of the camera covers the length of the aisle.

The height of the cameras from the surface, the distance between camera placement and/or direction of the cameras 1608 within the cluster 1660 may vary depending on the layout of the materials handling facility, the lighting conditions in the cluster, the volume of agents expected to pass through a portion of the cluster, the activities and/or volume of activities expected to occur at different locations within the cluster, etc. For example, cameras may typically be mounted horizontally every three to four feet in one direction and every four to five feet in another direction along the grid 1602 so that the field of view of each camera overlaps, as illustrated in FIG. 16.

In some implementations, the height of the cameras from the surface and the distance between cameras may be set so that their fields of view intersect and begin to overlap approximately seven feet above the surface of the materials handling facility. Positioning the cameras so that the fields of view overlap at approximately seven feet will result in the majority of agents being within a field of view of a camera at all times. If the field of view of the cameras did not overlap until they were approximately three feet above the surface, as an agent moves between the fields of view, the portion of the agent that is taller than approximately three feet would exit one field of view and not enter the next field of view until the agent has moved into that range of the camera. As such, a portion of the agent is not detectable as they transition between fields of view. Likewise, by overlapping the fields of view of multiple cameras, each of the overlapping cameras may capture images that include representations of the agent from slightly different perspectives.

This image data may be combined and utilized to develop a three dimensional, or partially three dimensional model, or agent pattern, of the agent.

While this example describes overlapping camera fields of view at approximately seven feet above the surface of the materials handling facility, in other implementations, the cameras may be positioned so that the fields of view begin to overlap at different heights (e.g., six feet, eight feet).

In some areas of the cluster, such as cluster area 1606, cameras 1608 may be positioned closer together and/or closer to the surface area, thereby reducing their field of view, increasing the amount of field of view overlap, and/or increasing the amount of coverage for the area. Increasing camera density may be desirable in areas where there is a high volume of activity (e.g., item picks, item places, agent dwell time), high traffic areas, high value items, poor lighting conditions, etc. By increasing the amount of coverage, the image data increases, thereby increasing the likelihood that an activity or action will be properly determined.

In some implementations, one or more markers 1610 may be positioned throughout the cluster and used to aid in alignment of the cameras 1608. The markers 1610 may be placed at any location within the cluster. For example, if the markers are placed where there is an overlap in the field of view of two or more cameras, the cameras may be aligned with respect to one another, thereby identifying the pixel overlap between the cameras and aligning the pixels of the cameras. The markers may be any identifiable indicator and may be temporary or permanent.

In some implementations, the markers 1610 may be placed on the surface of the materials handling facility. In other implementations, the markers 1610 may be placed on a visible surface of an inventory location 1630 within the cluster. In still other implementations, the inventory location 1630 itself may be utilized as a marker. Alternatively, or in addition thereto, one or more inventory items that are viewable by the cameras may be used as the marker 1610. In still other examples, the surface of the materials handling facility may have a detectable pattern, marks, defects, etc., that can be determined and used as markers 1610 to align cameras.

In some implementations, the markers 1610 may be temporarily placed at locations within the materials handling facility and used to calibrate the cameras. During calibration, the cameras may be aligned with respect to one another by aligning the position of the markers 1610 in each camera's field of view. Likewise, the field of view of each camera may be determined and associated with coordinates of the materials handling facility.

The cameras 1608 of a cluster may obtain images (still images or video) and process those images to reduce the image data and/or provide the image data to other components. As discussed above, image data for each image or frame may be reduced to only include pixel information for pixels that have been determined to have changed. For example, baseline image information may be maintained for a field of view of a camera corresponding to the static or expected view of the materials handling facility. Image data for an image may be compared to the baseline image information and the image data may be reduced by removing or subtracting out pixel information that is the same in the image data as the baseline image information. Image data reduction may be done by each camera. Alternatively, groups of cameras may be connected with a camera processor that processes image data from a group of cameras to reduce the image data of those cameras. Image data reduction is discussed above with respect to FIG. 12.

Real world positions for pixels of the anterior cameras may be determined in a similar manner to that discussed above with respect to the overhead cameras. For example, by mounting anterior cameras and orienting the field of view of those cameras toward inventory locations, the pixels of those cameras can be associated with real world positions of the inventory locations.

In some implementations, one or more markers may be positioned throughout the inventory locations to aid in alignment of the anterior cameras. The markers may be placed at any location that is within the field of view of one or more of the side view cameras. For example, if the markers are placed where there is an overlap in the field of view of two or more cameras, the cameras may be aligned with respect to one another, thereby identifying the pixel overlap between the cameras and aligning the pixels of the cameras. The markers may be any identifiable indicator and may be temporary or permanent.

In some implementations, the markers may be placed on a front surface of the inventory locations. In other implementations, an inventory location itself may be utilized as a marker. Alternatively, or in addition thereto, one or more inventory items that are viewable by the anterior cameras may be used as a marker.

Figure 17:
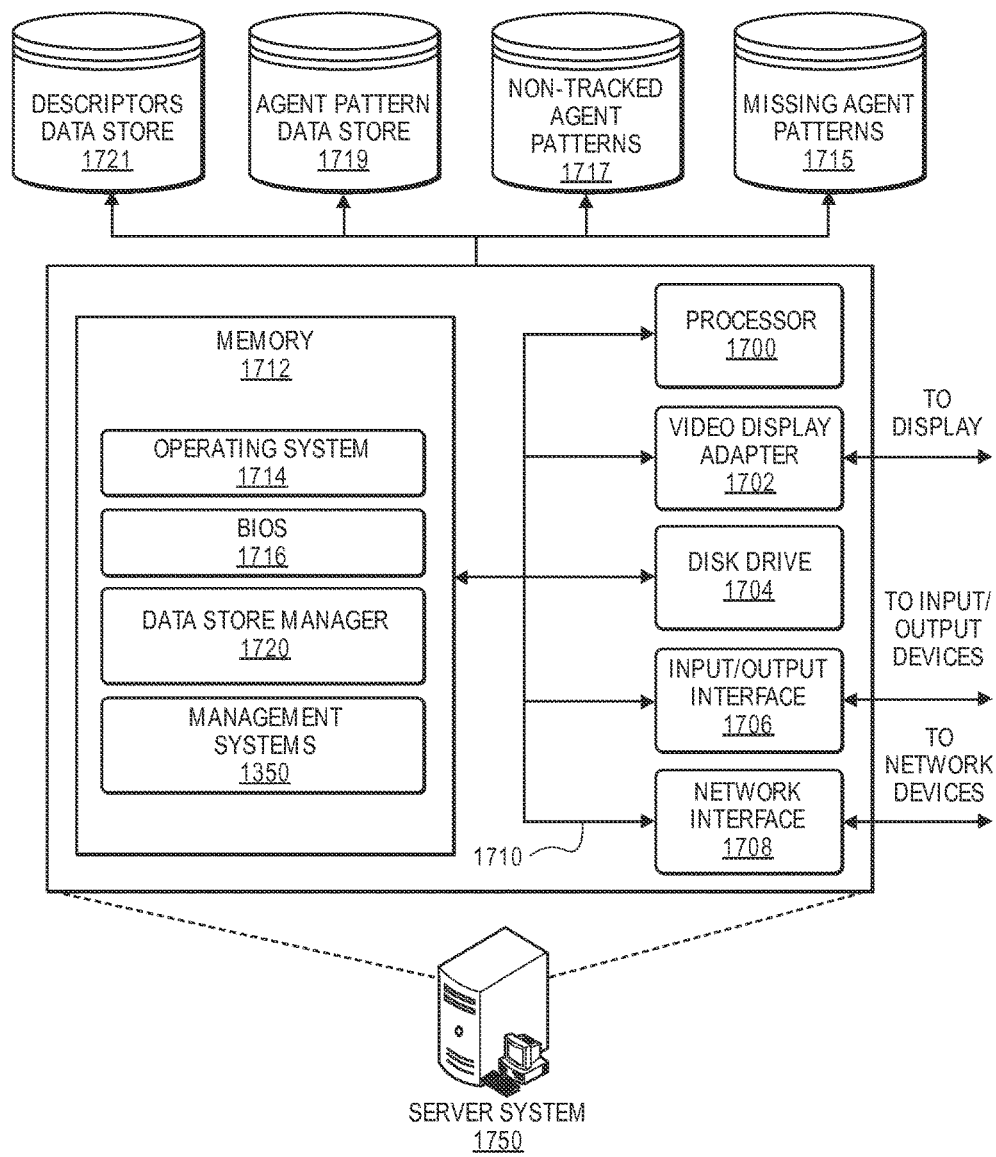
FIG. 17 is a block diagram of an illustrative implementation of a server system that may be used with various implementations.

FIG. 17 is a pictorial diagram of an illustrative implementation of a server system, such as the server system 1750 that may be used in the implementations described herein. The server system illustrated in FIG. 17 or another similar server system may be configured to operate as the cluster processing system, the cluster aggregation system and/or for the management systems 1350 (inventory management system, agent pattern management system).

The server system 1750 may include a processor 1700, such as one or more redundant processors, a video display adapter 1702, a disk drive 1704, an input/output interface 1706, a network interface 1708, and a memory 1712. The processor 1700, the video display adapter 1702, the disk drive 1704, the input/output interface 1706, the network interface 1708 and the memory 1712 may be communicatively coupled to each other by a communication bus 1710.

The video display adapter 1702 provides display signals to a local display (not shown in FIG. 17) permitting an operator of the server system 1750 to monitor and configure operation of the server system 1750. The input/output interface 1706 likewise communicates with external input/output devices not shown in FIG. 17, such as a mouse, keyboard, scanner, or other input and output devices that can be operated by an operator of the server system 1750. The network interface 1708 includes hardware, software, or any combination thereof, to communicate with other computing devices. For example, the network interface 1708 may be configured to provide communications between the server system 1750 and other computing devices via the network, such as the network 1502 discussed above with respect to FIG. 15.

The memory 1712 may be a non-transitory computer readable storage medium configured to store executable instructions accessible by the processor(s) 1700. In various implementations, the non-transitory computer readable storage medium may be implemented using any suitable memory technology, such as static random access memory (SRAM), synchronous dynamic RAM (SDRAM), nonvolatile/Flash-type memory, or any other type of volatile or permanent memory. In the illustrated implementation, program instructions and data implementing desired functions, such as those described herein, are shown stored within the non-transitory computer readable storage medium. In other implementations, program instructions may be received, sent, or stored upon different types of computer-accessible media, such as non-transitory media, or on similar media separate from the non-transitory computer readable storage medium. Generally speaking, a non-transitory, computer readable storage medium may include storage media or memory media such as magnetic or optical media, e.g., disk or CD/DVD-ROM. Program instructions and data stored via a non-transitory computer readable medium may be transmitted by transmission media or signals such as electrical, electromagnetic, or digital signals, which may be conveyed via a communication medium, such as a network and/or a wireless link, such as may be implemented via the network interface 1708.

In one implementation, the I/O interface 1706 may be configured to coordinate I/O traffic between the processor(s) 1700, the non-transitory computer readable storage medium 1712, and any peripheral devices, the network interface or other peripheral interfaces, such as input/output devices. In some implementations, the I/O interface 1706 may perform any necessary protocol, timing or other data transformations to convert data signals from one component (e.g., non-transitory computer readable storage medium 1712) into a format suitable for use by another component (e.g., processor(s) 1700). In some implementations, the I/O interface 1706 may include support for devices attached through various types of peripheral buses, such as a variant of the Peripheral Component Interconnect (PCI) bus standard or the Universal Serial Bus (USB) standard, for example. In some implementations, the function of the I/O interface 1706 may be split into two or more separate components, such as a north bridge and a south bridge, for example. Additionally, in some implementations, some or all of the functionality of the I/O interface 1706, such as an interface to the non-transitory computer readable storage medium 1712, may be incorporated directly into the processor(s) 1700. The memory 1712 is shown storing an operating system 1714 for controlling the operation of the server system 1750. A binary input/output system (BIOS) 1716 for controlling the low-level operation of the server system 1750 is also stored in the memory 1712.

The memory 1712 additionally stores computer executable instructions, that, when executed by the processor 1700 cause the processor to perform one or more of the processes discussed herein. The memory 1712 additionally stores program code and data for providing network services. The data store manager application 1720 facilitates data exchange between the data stores 1715, 1717, 1719, 1721 and/or other data stores.

As used herein, the term "data store" refers to any device or combination of devices capable of storing, accessing and retrieving data which may include any combination and number of data servers, databases, data storage devices and data storage media in any standard, distributed or clustered environment. The server system 1750 can include any appropriate hardware and software for integrating with the data stores 1715-1721 as needed to execute aspects of the management systems 1350.

The data stores 1715-1721 can include several separate data tables, databases or other data storage mechanisms and media for storing data relating to a particular aspect. For example, the data stores 1715-1721 illustrated include mechanisms for maintaining agent pattern and/or descriptor information (e.g., positions, agent pattern shapes, sizes, colors, depth maps, etc.), mappings between session identifiers and agent identifiers, etc. Depending on the configuration and use of the server system 1750, one or more of the data stores may not be included or accessible to the server system 1750 and/or other data stores may be included or accessible. For example, if the server system is supporting the cluster processing system, the server system 1750 may not include and/or be able to access an agent profile data store (not shown).

It should be understood that there can be many other aspects that may be stored in the data stores 1715-1721. The data stores 1715-1721 are operable, through logic associated therewith, to receive instructions from the server system 1750 and obtain, update or otherwise process data in response thereto.

The memory 1712 may also include the inventory management system, agent pattern management system, cluster processing system, or the cluster aggregation system, as discussed above. The corresponding server system 1750 may be executable by the processor 1700 to implement one or more of the functions of the server system 1750. In one implementation, the server system 1750 may represent instructions embodied in one or more software programs stored in the memory 1712. In another implementation, the server system 1750 can represent hardware, software instructions, or a combination thereof.

The server system 1750, in one implementation, is a distributed environment utilizing several computer systems and components that are interconnected via communication links, using one or more computer networks or direct connections. It will be appreciated by those of ordinary skill in the art that such a system could operate equally well in a system having fewer or a greater number of components than are illustrated in FIG. 17. Thus, the depiction in FIG. 17 should be taken as being illustrative in nature and not limiting to the scope of the disclosure.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer implemented method, comprising:
under control of one or more computing systems configured with executable instructions,
receiving first image data that includes an anterior representation of an agent located at a first position within a materials handling facility;
partitioning the first image data into:
a first partition of the first image data that includes a first portion of the first image data corresponding to a head region of the agent represented in the first image data; and
a second partition of the first image data that includes a second portion of the first image data corresponding to a body region of the agent represented in the first image data;
generating, for the first partition of the first image data, a first color signature representative of the first portion of the first image data;
generating, for the second partition of the first image data, a second color signature representative of the second portion of the first image data;
determining second image data, stored in a data store, that includes an anterior representation of an agent;
partitioning the second image data into:
a first partition of the second image data that includes a first portion of the second image data corresponding to a head region of the agent represented in the second image data; and
a second partition of the second image data that includes a second portion of the second image data corresponding to a body region of the agent represented in the second image data;
generating, for the first partition of the second image data, a third color signature representative of the first portion of the second image data;
generating, for the second partition of the second image data, a fourth color signature representative of the second portion of the second image data;
comparing the first color signature with the third color signature to determine a first similarity between the first color signature and the third color signature;
comparing the second color signature with the fourth color signature to determine a second similarity between the second color signature and the fourth color signature;
determining, based at least in part on the first similarity and the second similarity that the first image data and the second image data both include an anterior representation of a same agent; and
storing the first position as a current position of the agent represented in both the first image data and the second image data.

2. The computer implemented method of claim 1, wherein generating the first color signature includes vector quantizing the first portion of the first image data to generate the first color signature.

3. The computer implemented method of claim 1, wherein comparing the first color signature with the third color signature includes determining a difference between the first color signature and the third color signature using an earth mover's distance algorithm.

4. The computer implemented method of claim 1, wherein:
the second image data is determined based at least in part on a time since a position of the agent represented in the second image data was updated; and
an identity of the agent in the first image data is unknown.

5. A computing system, comprising:
a processor; and
a memory coupled to the processor and storing program instructions that when executed by the processor cause the processor to at least:
receive first image data that includes a plurality of pixels corresponding to an anterior representation of an agent;
partition the first image data into:
a first partition of the first image data that includes a first portion of the first image data corresponding to a first portion of the agent; and
a second partition of the first image data that includes a second portion of the first image data corresponding to a second portion of the agent;
generate, based at least in part on the first partition and the second partition, a first agent color signature representative of color values corresponding to the plurality of pixels;
compare the first agent color signature with a second agent color signature corresponding to a second image data to determine a similarity between the first agent color signature and the second agent color signature;
determine a weighted similarity such that a portion of the first image data corresponding to a head of the agent represented in the first image data and a portion of the second image data corresponding to a head of the agent represented in the second image data has a higher weight; and
determine, based at least in part on the similarity or the weighted similarity, that the agent represented in the first image data is likely the agent represented in the second image data.

6. The computing system of claim 5, wherein the program instructions that when executed by the processor to cause the processor to generate the first agent color signature, further include program instructions that cause the processor to at least:
generate, for the first partition of the first image data, a first color signature representative of the first portion of the first image data;
generate, for the second partition of the first image data, a second color signature representative of the second portion of the first image data; and
wherein the first agent color signature includes the first color signature and the second color signature.

7. The computing system of claim 6, wherein:
the second agent color signature includes a third color signature and a fourth color signature; and
the program instructions that when executed by the processor to cause the processor to compare the first agent color signature with a second agent color signature further include program instructions that cause the processor to at least:
compare the first color signature with the third color signature to determine a first similarity between the first color signature and the third color signature; and compare the second color signature with the fourth color signature to determine a second similarity between the second color signature and the fourth color signature.

8. The computing system of claim 7, wherein the program instructions that when executed by the processor to cause the processor to determine that the agent represented in the first image data is likely the agent represented in the second image data, further include program instructions that cause the processor to at least:
  determine, based at least in part on the first similarity and the second similarity, that the agent represented in the first image data is likely the agent represented in the second image data.

9. The computing system of claim 7, wherein:
the third color signature corresponds to a first partition of the second image data; and
the fourth color signature corresponds to a second partition of the second image data.

10. The computing system of claim 9, wherein:
the first partition of the first image data and the first partition of the second image data both include pixels corresponding to similar portions of the agent represented in the first image data and the second image data.

11. The computing system of claim 5, wherein:
the second image data is selected based at least in part on a time since a position of the agent represented in the second image data was updated.

12. The computing system of claim 5, wherein the program instructions further cause the processor to at least:
  process the first image data to determine a first plurality of pixels corresponding to the anterior representation of the agent; and
  process the first image data to determine a second plurality of pixels that do not correspond to the anterior representation of the agent.

13. The computing system of claim 5, wherein:
the first image data is obtained from a camera coupled to a shelf of an inventory area within a materials handling facility that is positioned to obtain anterior view images of agents within the materials handling facility; and
the first image data is obtained in response to a detection of a presence of the agent in a field of view of the camera.

14. A computer implemented method, comprising:
under control of one or more computing systems configured with executable instructions,
  receiving first image data from a first image capture device located within a materials handling facility, wherein the first image data includes a plurality of pixels illustrating an anterior view of at least a portion of an agent located at a position within the materials handling facility;
  partitioning the first image data into:
    a first partition that includes a first portion of the first image data corresponding to a head region of the agent represented in the first image data; and
    a second partition that includes a second portion of the first image data;
  generating a first color signature corresponding to color values of pixels included in the first partition and representative of the head region of the agent;
  generating a second color signature corresponding to color values of pixels included in the second partition;
  comparing the first color signature with a first stored color signature corresponding to color values of pixels of stored image data representative of the head region of the agent represented in the stored image data to determine a first similarity between the first color signature and the first stored color signature;
  comparing the second color signature with a second stored color signature corresponding to color values of pixels of stored image data representative of a second region of the agent represented in the stored image data to determine a second similarity between the second color signature and the second stored color signature;
  determining, based at least in part on the first similarity and the second similarity that the agent represented in the first image data is potentially the agent represented in the stored image data; and
  including an identification of the agent represented in stored image data in a list of candidate agents that are potentially the agent represented in the first image data such that the list only includes agents that are determined to potentially be the agent represented in the first image data.

15. The computer implemented method of claim 14, further comprising:
providing the first image data and image data corresponding to each of a plurality of agents identified on the list of candidate agents for manual review.

16. The computer implemented method of claim 14, further comprising:
  comparing the first color signature with a third stored color signature corresponding to color values of pixels of second stored image data representative of at least a portion of an agent to determine a third similarity between the first color signature and the third stored color signature;
  determining, based at least in part on the third similarity of each of the plurality of partitions that the agent represented in the first image data is not potentially the agent represented in the third stored image data; and
  not including an identification of the agent represented in the second stored image data in the list of candidate agents.

17. The computer implemented method of claim 16, wherein a first stored position corresponding to the agent represented in the stored image data and a second stored position corresponding to the agent represented in the second stored image data are within a defined distance of the position of the agent represented in the first image data.

18. The computer implemented method of claim 17, wherein the defined distance is determined based at least in part on a time since the first stored position of the agent represented in the stored image data was updated.

19. The computer implemented method of claim 14, wherein:
each color signature is determined based on a k-means algorithm; and
each similarity is determined based on an earth mover's distance algorithm.

20. A method, comprising:
receiving first image data that includes a plurality of pixels corresponding to a representation of an agent;
generating a first agent color signature representative of color values corresponding to the plurality of pixels, wherein the first agent color signature is determined based at least in part on a k-means algorithm; and comparing the first agent color signature with a second agent color signature corresponding to a second image data that includes a second plurality of pixels corresponding to a representation of a second agent to determine a similarity between the first agent color signature and the second agent color signature, wherein the similarity is determined based at least in part on an earth mover's distance algorithm.

21. The method of claim 20, further comprising:

generating from the first image data a first color signature representative of a first portion of the first image data;

generating from the first image data a second color signature representative of a second portion of the first image data; and wherein the first agent color signature includes the first color signature and the second color signature.

22. The method of claim 20, further comprising:

determining, based at least in part on the similarity, that the agent represented in the first image data is the same agent as the second agent represented in the second image data.

\* \* \* \* \*